US009345972B2

(12) United States Patent
Nishida et al.

(10) Patent No.: US 9,345,972 B2
(45) Date of Patent: May 24, 2016

(54) INFORMATION STORAGE MEDIUM, IMAGE GENERATION SYSTEM, AND IMAGE GENERATION METHOD

(75) Inventors: Kouki Nishida, Fujisawa (JP); Masato Aikawa, Kanagawa-ken (JP); Wataru Tada, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 186 days.

(21) Appl. No.: 13/156,837

(22) Filed: Jun. 9, 2011

(65) Prior Publication Data

US 2011/0304617 A1 Dec. 15, 2011

(30) Foreign Application Priority Data

Jun. 11, 2010 (JP) .................................. 2010-134537

(51) Int. Cl.
*A63F 13/5258* (2014.01)
*A63F 13/803* (2014.01)
*A63F 13/5252* (2014.01)

(52) U.S. Cl.
CPC ......... *A63F 13/5258* (2014.09); *A63F 13/5252* (2014.09); *A63F 13/803* (2014.09)

(58) Field of Classification Search
CPC ............ A63F 13/10; A63F 2300/8011; A63F 2300/6045; A63F 2300/6676; A63F 13/5252; A63F 13/5258; H04N 13/0296; H04N 13/0497; H04N 13/0468; H04N 13/0239; H04N 13/0275; G06T 15/20
USPC ...................................................... 345/419
See application file for complete search history.

(56) References Cited

U.S. PATENT DOCUMENTS 6,947,046 B2 * 9/2005 Nimura et al. ................ 345/473
7,470,195 B1 12/2008 Baldwin, III et al.
(Continued)

FOREIGN PATENT DOCUMENTS

EP  1 136 107 A2  9/2001
JP  A-8-117440  5/1996
(Continued)

OTHER PUBLICATIONS

Jul. 10, 2015 European Search Report issued in European Application No. 11169585.4.
(Continued)

*Primary Examiner* — Gregory J Tryder
*Assistant Examiner* — Kwang Lee
(74) *Attorney, Agent, or Firm* — Oliff PLC

(57) ABSTRACT

An information storage medium that stores a program, the program causing a computer to function as a moving object control section that controls movement of a moving object in a virtual three-dimensional space based on an operation input, a virtual camera control section that controls a setting of the virtual camera, and an image generation section that generates an image of the virtual three-dimensional space viewed from the virtual camera. The virtual camera control section includes a first camera control section that performs a first camera control process based on camera control data that defines a moving route of the virtual camera as a change in at least one of a relative position and a relative direction of the virtual camera with respect to the moving object, and at least one of a position and a direction of the moving object in the virtual three-dimensional space. The virtual camera control section disposes the virtual camera in the virtual three-dimensional space based on a first setting value obtained by the first control process.

24 Claims, 23 Drawing Sheets

(56) References Cited

U.S. PATENT DOCUMENTS

| | | | | |
|---|---|---|---|---|
| 2006/0061567 A1* | 3/2006 | Ouchi | | 345/419 |
| 2007/0188501 A1 | 8/2007 | Yee et al. | | |
| 2009/0244064 A1* | 10/2009 | Inokuchi et al. | | 345/420 |
| 2010/0020080 A1* | 1/2010 | Iwanaga | | 345/426 |
| 2011/0124385 A1* | 5/2011 | Otomo et al. | | 463/3 |
| 2012/0092325 A1* | 4/2012 | Katano | | 345/419 |

FOREIGN PATENT DOCUMENTS

| | | |
|---|---|---|
| JP | B2-2687987 | 12/1997 |
| JP | 03-447397 B2 | 9/2003 |
| JP | B2-4144017 | 9/2008 |

OTHER PUBLICATIONS

Thomas Oskam et al. "Visibility Transition Planning for Dynamic Camera Control", Proceedings of the 2009 ACM Siggraph/Eurographics Symposium on Computer Animation, SCA Aug. 1, 2009, pp. 55-65.

Nicolas Halper et al. "A Camera Engine for Computer Games: Managing the Trade-Off Between Constraint Satisfaction and Frame Coherence", Computer Graphics Form, North Holland, Sep. 3, 2001, pp. C/174-C/183.

* cited by examiner

FIG.5

| | $t_0$ | $t_1$ | $t_2$ | | $t_n$ | |
|---|---|---|---|---|---|---|
| POSITION | $(LX_0, LY_0, LZ_0)$ | $(LX_1, LY_1, LZ_1)$ | | | $(LX_n, LY_n, LZ_n)$ | |
| DIRECTION (ROTATION) | $(\theta_{x0}, \theta_{y0}, \theta_{z0})$ | $(\theta_{x1}, \theta_{y1}, \theta_{z1})$ | | | $(\theta_{xn}, \theta_{yn}, \theta_{zn})$ | |
| ANGLE OF VIEW | $av_0$ | $av_1$ | | | $av_n$ | |

350

360 — POSITION
370 — DIRECTION (ROTATION)
380 — ANGLE OF VIEW

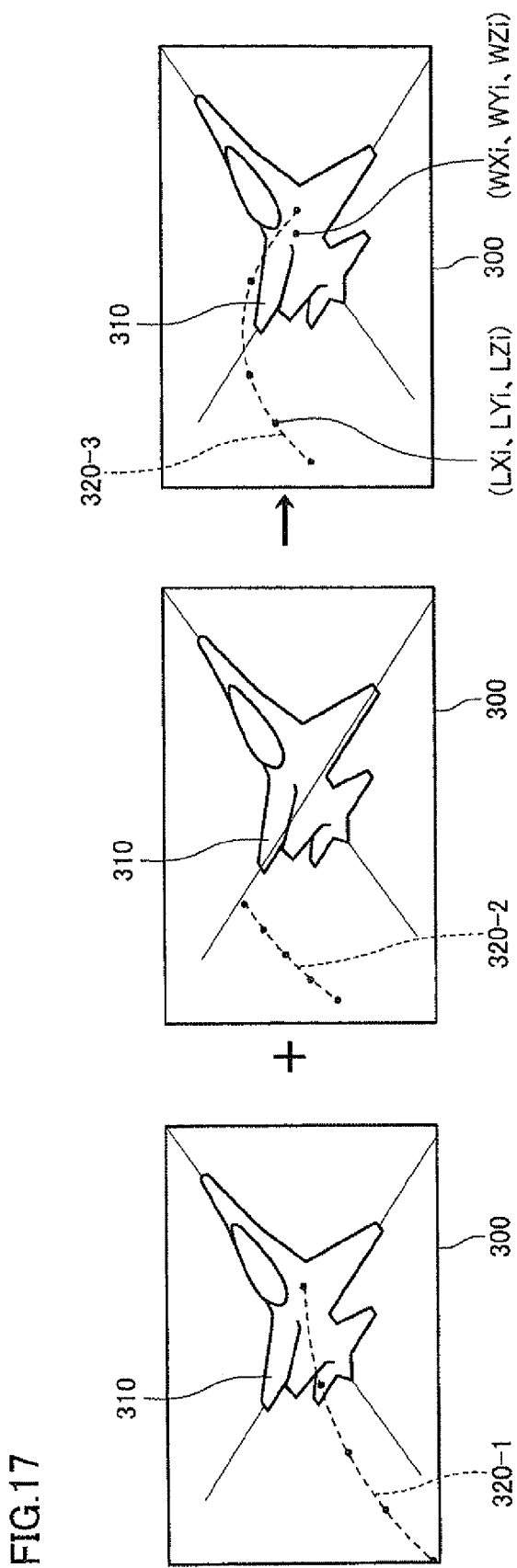

INFORMATION STORAGE MEDIUM, IMAGE GENERATION SYSTEM, AND IMAGE GENERATION METHOD

Japanese Patent Application No. 2010-134537, filed on Jun. 11, 2010, is hereby incorporated by reference in its entirety.

BACKGROUND OF THE INVENTION

The present invention relates to an information storage medium, an image generation system, and an image generation method.

A flight shooting game that allows the player to move a player's aircraft in an object space, and shoot an enemy aircraft by performing an input operation has been popular.

In such a flight shooting game and the like, the viewpoint can be switched between a first-person viewpoint and a third-person viewpoint. The virtual camera may be switched from a normal camera position to another camera position when a given event or the like has occurred so that the player can enjoy an impressive (exciting) battle scene at various angles. Japanese Patent No. 4144017 and Japanese Patent No. 2687987 disclose technology in this field.

However, only a monotonous camera effect is obtained by merely switching the camera position.

The inventor of the invention is involved in development of a system that implements an impressive camera effect (e.g., causing the virtual camera to approach a given event position along an effective path) in order to implement a more interesting camera effect.

When moving the virtual camera in a state in which the player's aircraft moves, the virtual camera may be buried in the moving object if the virtual camera is moved to intersect the moving object, so that an inappropriate image may be generated. This impairs the camera effect so that the player may lose interest in the game. However, the processing load increases when determining whether or not the virtual camera intersects the moving object in order to prevent such a situation.

SUMMARY

According to a first aspect of the invention, there is provided a non-transitory computer-readable information storage medium that stores a program that generates an image of a virtual three-dimensional space viewed from a virtual camera, a moving object being disposed in the virtual three-dimensional space, the program causing a computer to function as:

a moving object control section that controls movement of the moving object in the virtual three-dimensional space based on an operation input;

a virtual camera control section that controls a setting of the virtual camera; and an image generation section that generates an image of the virtual three-dimensional space viewed from the virtual camera, the virtual camera control section including a first camera control section that performs a first camera control process based on camera control data that defines a moving route of the virtual camera as a change in at least one of a relative position and a relative direction of the virtual camera with respect to the moving object, and at least one of a position and a direction of the moving object in the virtual three-dimensional space, and the virtual camera control section disposing the virtual camera in the virtual three-dimensional space based on a first setting value obtained by the first camera control process.

According to a second aspect of the invention, there is provided an image generation system that generates an image of a virtual three-dimensional space viewed from a virtual camera, a moving object being disposed in the virtual three-dimensional space, the image generation system including:

a moving object control section that controls movement of the moving object in the virtual three-dimensional space based on an operation input;

a virtual camera control section that controls a setting of the virtual camera; and an image generation section that generates an image of the virtual three-dimensional space viewed from the virtual camera, the virtual camera control section including a first camera control section that performs a first camera control process based on camera control data that defines a moving route of the virtual camera as a change in at least one of a relative position and a relative direction of the virtual camera with respect to the moving object, and at least one of a position and a direction of the moving object in the virtual three-dimensional space, and the virtual camera control section disposing the virtual camera in the virtual three-dimensional space based on a first setting value obtained by the first camera control process.

According to a third aspect of the invention, there is provided an image generation method that generates an image of a virtual three-dimensional space viewed from a virtual camera using a computer, a moving object being disposed in the virtual three-dimensional space, the image generation method including:

a moving object control step that controls movement of the moving object in the virtual three-dimensional space based on an operation input;

a virtual camera control step that controls a setting of the virtual camera; and an image generation step that generates an image of the virtual three-dimensional space viewed from the virtual camera, the virtual camera control step including performing a first camera control process based on camera control data that defines a moving route of the virtual camera as a change in at least one of a relative position and a relative direction of the virtual camera with respect to the moving object, and at least one of a position and a direction of the moving object in the virtual three-dimensional space, and the virtual camera control step disposing the virtual camera in the virtual three-dimensional space based on a first setting value obtained by the first camera control process.

BRIEF DESCRIPTION OF THE SEVERAL VIEWS OF THE DRAWING

FIG. 5 is a diagram illustrating an example of camera control data.

FIG. 17 is a diagram illustrating a blend control process on a plurality of camera setting values.

DETAILED DESCRIPTION OF THE EMBODIMENT

Figure 1:
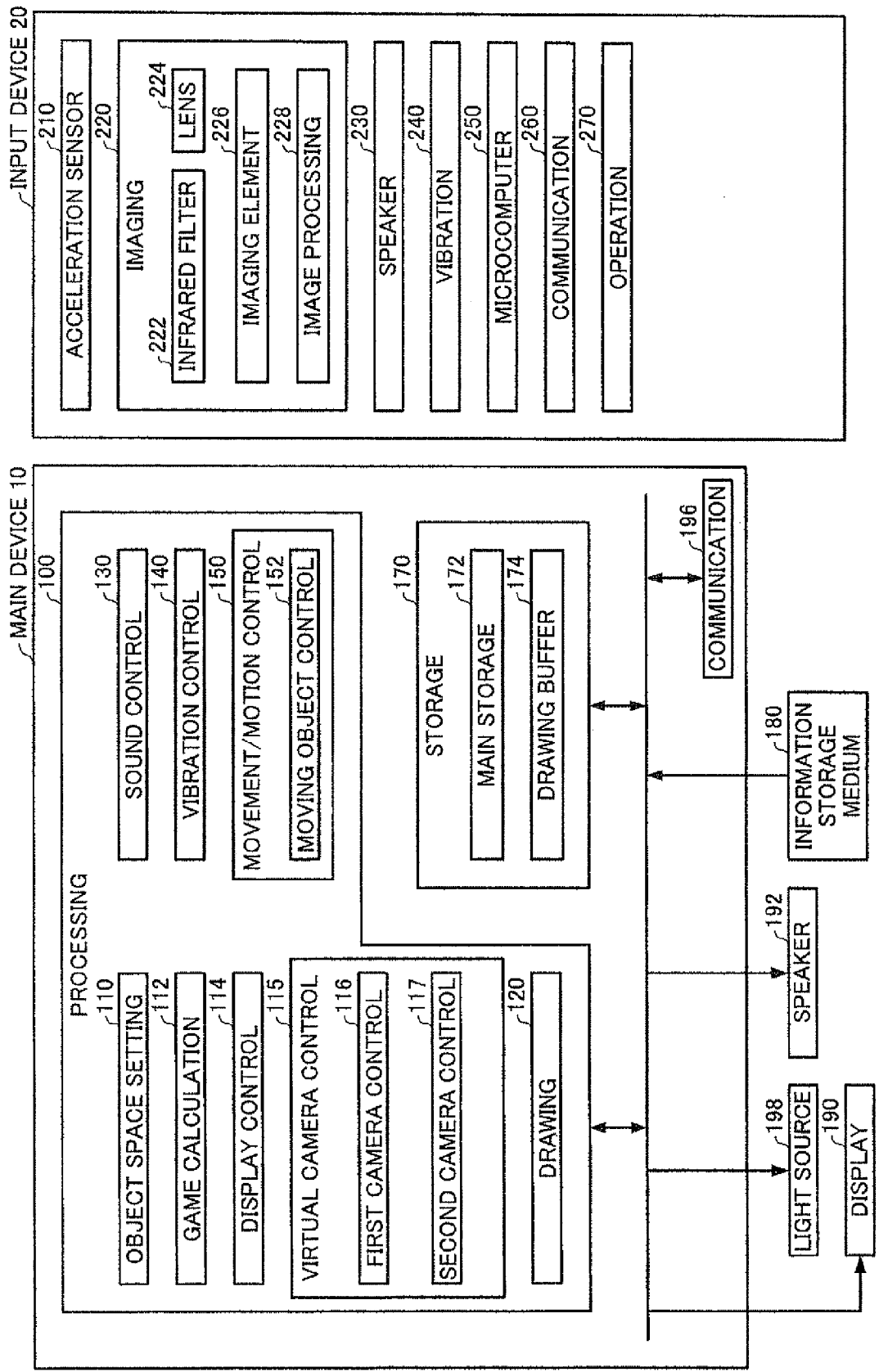
FIG. 1 is a functional block diagram illustrating a game system according to one embodiment of the invention.

The invention may provide an information storage medium, an image generation system, and an image generation method that can implement an effective camera effect without performing a complex control process such as determining whether or not the moving route of a camera intersects an object.

(1) One embodiment of the invention relates to a non-transitory computer-readable information storage medium that stores a program that generates an image of a virtual three-dimensional space viewed from a virtual camera, a moving object being disposed in the virtual three-dimensional space, the program causing a computer to function as:

a moving object control section that controls movement of the moving object in the virtual three-dimensional space based on an operation input;

a virtual camera control section that controls a setting of the virtual camera; and an image generation section that generates an image of the virtual three-dimensional space viewed from the virtual camera, the virtual camera control section including a first camera control section that performs a first camera control process based on camera control data that defines a moving route of the virtual camera as a change in at least one of a relative position and a relative direction of the virtual camera with respect to the moving object, and at least one of a position and a direction of the moving object in the virtual three-dimensional space, and the virtual camera control section disposing the virtual camera in the virtual three-dimensional space based on a first setting value obtained by the first camera control process.

Another embodiment of the invention relates to an image generation system including the above sections.

Another embodiment of the invention relates to an image generation method that generates an image of a virtual three-dimensional space viewed from a virtual camera using a computer, a moving object being disposed in the virtual three-dimensional space, the image generation method including steps that respectively perform the processes of the above sections.

The moving object may be a player's moving object, or may be an NPC moving object. The camera control process performed on the virtual camera includes setting or controlling the position, the direction, the moving direction, the moving speed, the angle of view, and the like of the virtual camera.

The camera control data includes at least information about the position of the virtual camera. The camera control data may also include information about the direction (rotation) or the angle of view of the virtual camera.

The first camera control process may be performed when a given event has occurred. The first camera control process may be terminated when a given period of time has elapsed after the given event has occurred, or when the given event has ended.

For example, position (and direction) information about the virtual camera in the world coordinate system may be calculated based on the camera control data (position and direction in local coordinate system) defined in the local coordinate system of the moving object, and placement information (position/direction information) about the moving object in the world coordinate system.

When moving the virtual camera, the virtual camera may be buried in the moving object if the virtual camera is moved to intersect the moving object. According to the above embodiment, the virtual camera can be moved along the moving route defined by the relative position (position in the local coordinate system of the moving object) with respect to the moving object, and a camera effect can be implemented without performing a complex control process such as determining whether or not the position of the camera intersects the moving object.

(2) In each of the above information storage medium, image generation system, and image generation method, the camera control data may include data that defines a moving route that connects a given reference position in a local coordinate system of the moving object with a target position set for an item attached to the moving object; and the first camera control section may move the virtual camera to the target position along the moving route when a given operation input has been performed on the item attached to the moving object.

A given operation input is an essential condition for the first camera control process, but is not a sufficient condition for the first camera control process. For example, the first camera control process may be performed when a given operation input has been performed, and a predetermined parameter of the moving object or another moving object as the item operation target has satisfied a predetermined condition.

The item moves to follow the moving object. For example, the item may be a machine gun attached to the moving object, or a sword or a ball held by the moving object.

A given operation input performed on the item may be an operation input that instructs an attack using the item, or an operation input that causes the item to make a motion (e.g., throwing or hitting the item). The item need not be always attached to the moving object. For example, the item may be attached to the moving object before the operation input on the item is performed, and may move separately from the moving object after the operation input on the item has been performed.

The camera control data may include information about the position coordinates, the direction (rotation), or the angle of view of the virtual camera in the local coordinate system of the moving object, for example. The position coordinates may be coordinates along the trajectory (moving route). The direction may be defined as the direction in which the item is within in the line-of-sight direction. The camera control data may also include another parameter (e.g., depth of field).

The trajectory (moving route) is preferably set so as not to intersect the moving object.

(3) In each of the above information storage medium, image generation system, and image generation method, the first camera control section may start the first camera control process based on a start timing of the operation input on the item, and may finish the first camera control process based on an end timing of the operation input on the item.

The camera control data may defines data (data about the position, direction, angle of view, and the like) that indicates the trajectory of the virtual camera within a predetermined period in time series. The trajectory of the virtual camera may be reproduced by reproducing the data from the starting point to the end point of the trajectory in time series. The data may be reproduced from the starting point at the start timing, and reproduction may be terminated at the end timing. For example, when the end timing has occurred before the end point of the trajectory has been reached, reproduction of the data may be terminated at the end timing. When the end timing has not occurred when the end point of the trajectory has been reached, the data defined corresponding to the end point of the trajectory may be continuously reproduced until the end timing occurs.

(4) In each of the above information storage medium, image generation system, and image generation method, when the operation input on the item has ended, the first camera control section may return a state of the virtual camera to a state indicated by the camera control data when the operation input on the item has started from a state indicated by the camera control data when the operation input on the item has ended.

For example, when the camera control data defines data (data about the position, direction, angle of view, and the like) that indicates the trajectory of the virtual camera within a predetermined period in time series, the virtual camera may be returned to the position at the start timing of the operation input on the item by reproducing the camera control data from the reproduction start position to the starting point of the trajectory in the reverse direction along the time axis using the position along the trajectory when the operation input on the item has ended as the return control reproduction start position.

(5) In each of the above information storage medium, image generation system, and image generation method, the camera control data may include data corresponding to a plurality of the moving routes different from each other for the item; and the first camera control section may select the camera control data corresponding to one of the plurality of moving routes based on a position or a direction of the moving object or a predetermined game parameter, and may perform the first camera control process using the selected camera control data.

When the altitude of the moving object is low, or the moving object is positioned in an area in which a number of obstacles are present, the camera control data for which the moving route is set within a given range from the moving object may be selected.

(6) In each of the above information storage medium, image generation system, and image generation method, the first camera control section may set a given point on the moving route as at least one of a reproduction start position and a reproduction end position, and may move the virtual camera along a moving route specified by at least one of the reproduction start position and the reproduction end position.

The direction (rotation) or the angle of view may be defined together with the position along the moving route. In this case, the virtual camera can be disposed in a direction or at an angle of view appropriate for the moving route.

For example, the reproduction start position or the reproduction end position may be set based on an operation input.

(7) In each of the above information storage medium, image generation system, and image generation method, the first camera control section may set a moving direction along the moving route to a forward direction or a reverse direction, and may move the virtual camera along the moving route in the set moving direction.

(8) In each of the above information storage medium, image generation system, and image generation method, the first camera control section may reset a start position that is a given point on the moving route based on at least one of a distance and a positional relationship between the moving object and another moving object, an operation input, and a given parameter, and may move the virtual camera along the moving route.

The other moving object may be a second moving object that is followed target by the moving object, for example. The operation input may be a moving direction operation input, an acceleration/deceleration operation input, or another operation input.

For example, an operation input can be reflected in the camera control process based on the camera control data by setting data that indicates movement in the forward direction along the trajectory in a period from t0 to t1, setting data that indicates movement in the reverse direction along the trajectory in a period from t1 to t2, and changing the reproduction start position to t0 or t1 based on the operation input.

(9) In each of the above information storage medium, image generation system, and image generation method, the first camera control section may calculate a relative position of the item as an operation target with respect to the moving object in real time based on an operation input, and may perform select of the camera control data or change of the reproduction end position of the moving route based on the calculated relative position.

For example, when the moving object includes a plurality of joints, and the motion of the moving object is controlled, the relative position of the item with respect to a representative point (point having position coordinates) of the moving object changes. In this case, the relative position of the item as an operation target with respect to the moving object may be calculated in real time based on motion data.

(10) In each of the above information storage medium, image generation system, and image generation method, the virtual camera control section may further include a second camera control section that performs a second camera control process on the virtual camera before the first camera control process starts and continues the second camera control process after the first camera control process has started; and the virtual camera control section may blend the first setting value obtained by the first camera control process and a second setting value obtained by the second camera control process after the first camera control process has started, and may dispose the virtual camera in the virtual three-dimensional space based on a setting value obtained by blending the first setting value and the second setting value.

(11) In each of the above information storage medium, image generation system, and image generation method, the virtual camera control section may blend the first setting value and the second setting value while changing a blending ratio with passage of time.

The blending ratio may be changed linearly, or may be changed according to a given function.

The blending ratio may be set so that the ratio of the first camera setting value increases with the passage of time. In this case, the effect of the first camera control process increases with the passage of time in a period from the time fn to the time fn+m.

(12) In each of the above information storage medium, image generation system, and image generation method, the second camera control section may perform the second camera control process based on camera control data that defines a moving route of the virtual camera as a change in at least one of a relative position and a relative direction of the virtual camera with respect to the moving object, and at least one of a position and a direction of the moving object in the virtual three-dimensional space.

(13) In each of the above information storage medium, image generation system, and image generation method, the virtual camera control section may perform a transition process that moves the virtual camera from a position of the virtual camera in a local coordinate system of the moving object before the first camera control process starts, to a given reference position in the local coordinate system of the moving object specified by the camera control data.

For example, when the given operation input has ended, the state of the virtual camera may be returned to the state before the transition process is performed from the state indicated by the camera control data when the given operation input has ended.

(14) In each of the above information storage medium, image generation system, and image generation method, when the operation input has been performed on a plurality of the items attached to the moving object, the first camera control section may select one item among the items, and may perform the first camera control process based on the camera control data corresponding to the selected item.

The item may be selected randomly, or an item that satisfies a given condition may be selected.

Exemplary embodiments of the invention are described below. Note that the following exemplary embodiments do not in any way limit the scope of the invention laid out in the claims. Note that all of the elements of the following exemplary embodiments should not necessarily be taken as essential elements of the invention.

1. Configuration

FIG. 1 is a functional block diagram of a game system according to one embodiment of the invention. Note that the game system according to one embodiment of the invention need not necessarily include all of the sections illustrated in FIG. 1, Some of the sections illustrated in FIG. 1 may be omitted.

The game system according to one embodiment of the invention includes a main device 10, an input device 20, an information storage medium 180, a display section (display device) 190, a speaker 192, and a light source 198.

The input device 20 includes an acceleration sensor 210, an imaging section 220, a speaker 230, a vibration section 240, a microcomputer 250, a communication section 260, and an operation section 270.

The acceleration sensor 210 detects three-axis (X-axis, Y-axis, and Z-axis) accelerations. Specifically, the acceleration sensor 210 detects accelerations in the vertical direction, the transverse direction, and the forward/backward direction. The acceleration sensor 210 detects accelerations every 5 msec, and the accelerations detected by the acceleration sensor 210 are transmitted to the main device 10 via the communication section 260. The acceleration sensor 210 may detect one-axis, two-axis, or six-axis accelerations.

The imaging section 220 includes an infrared filter 222, a lens 224, an imaging element (image sensor) 226, and an image processing circuit 228. The infrared filter 222 is disposed on the front side of the input device 20, and allows only infrared radiation to pass through from light incident from the light source 198 that is disposed corresponding to the display section 190. The lens 224 condenses the infrared radiation that has passed through the infrared filter 222, and emits the infrared radiation to the imaging element 226. The imaging element 226 is a solid-state imaging element such as a CMOS sensor or a CCD. The imaging element 226 images infrared radiation condensed by the lens 224 to generate a captured image. The image processing circuit 228 processes the captured image generated by the imaging device 226. For example, the image processing circuit 228 processes the captured image generated by the imaging device 226 to detect a high luminance portion, and detects light source position information (specified position) in the captured image. When a plurality of light sources are provided, the image processing circuit 228 detects a plurality of pieces of position information in the captured image. The image processing circuit 228 may detect a plurality of pieces of position information within the captured image by utilizing a plurality of light sources, and calculate the rotational angle (inclination) of the detected position information with respect to a reference axis to calculate the inclination of the input device 20 with respect to the light sources. The position information detected in the captured image is transmitted to the main device 10 through the communication section 260.

The speaker 230 outputs sound acquired from the main device 10 via the communication section 260.

The vibration section (vibrator) 240 receives a vibration signal transmitted from the main device 10, and operates based on the vibration signal.

The microcomputer 250 transmits an input signal output from the operation section 270 and the accelerations detected by the acceleration sensor 210 to the main device 10 through the communication section 260, or transmits the position information detected by the imaging section 220 to the main device 10 through the communication section 260. The microcomputer 250 outputs sound or operates the vibrator based on data from received from the main device 10.

The communication section 260 includes an antenna and a wireless module, and exchanges data with the main device 10 via wireless communication using the Bluetooth (registered trademark) technology, for example. The communication section 260 transmits the accelerations detected by the acceleration sensor 210, the position information detected by the imaging section 220, and the like to the main device 10 alternately at intervals of 4 msec and 6 msec. The communication section 260 may be connected to the main device 10 via a communication cable, and may exchange information with the main device 10 via the communication cable.

The operation section 270 includes operating sections such as a direction key (arrow key), buttons (e.g., buttons A and B), and a control stick (analog key) that allows the player perform a direction input, and outputs an input signal based on an input operation of the player. The operation signal is transmitted to the main device 10 via the communication section 260.

The input device 20 may include a gyrosensor that detects an angular velocity that changes due to an input operation performed by the player.

The controller 20 may include a pressure sensor. The pressure sensor detects a pressure that occurs due to an input operation of the player. For example, the pressure sensor detects a pressure that occurs due to the weight of the player or force applied by the player. The input device 20 may include a plurality of pressure sensors, and each of the pressure sensors may detect a pressure value.

The input device 20 according to one embodiment of the invention also encompasses the main device 10 (game device or portable game device) that is integrated with the input device 20, a portable telephone, and the like.

The main device 10 according to one embodiment of the invention is described below. The main device 10 according to one embodiment of the invention includes a storage section 170, a processing section 100, and a communication section 196.

The storage section 170 serves as a work area for the processing section 100, the communication section 196, and the like. The function of the storage section 170 may be implemented by hardware such as a RAM (VRAM).

The storage section 170 according to one embodiment of the invention includes a main storage section 172 and a drawing buffer 174. The main storage section 172 serves as a work area for the processing section 100, the communication section 196, and the like. The function of the storage section 170 may be implemented by hardware such as a RAM (VRAM). The drawing buffer 174 stores an image generated by a drawing section 120.

The processing section 100 performs various processes according to one embodiment of the invention based on a program (data) stored in (read from) the information storage medium 180. Specifically, the information storage medium 180 stores a program that causes a computer to function as each section according to one embodiment of the invention (i.e., a program that causes a computer to perform the process of each section). The information storage medium 180 includes a memory card that stores a player's personal data, game save data, and the like.

The communication section 196 can communicate with another main device 10 (game device) through a network (Internet). The function of the communication section 196 may be implemented by hardware such as a processor, a communication ASIC, or a network interface card, a program, or the like. The communication section 196 can perform cable communication and wireless communication.

The communication section 196 includes an antenna and a wireless module, and exchanges data with the input device 20 through the communication section 260 of the input device 20 using the Bluetooth (registered trademark) technology. For example, the communication section 196 transmits sound data and a vibration signal to the input device 20, and receives the input signal output from the operation section 270, accelerations detected by the acceleration sensor 210, and information detected by the imaging section 220 from the input device 20 alternately at intervals of 4 msec and 6 msec.

A program (data) that causes a computer to function as each section according to one embodiment of the invention may be distributed to the information storage medium 180 (or the storage section 170) from a storage section or an information storage medium included in a server via a network. Use of the information storage medium included in the server is also intended to be included within the scope of the invention.

The processing section 100 (processor) performs a game calculation process, an image generation process, and a sound control process based on information received from the input device 20, a program loaded into the storage section 170 from the information storage medium 180, and the like.

The processing section 100 according to one embodiment of the invention includes an object space setting section 110, a movement/motion processing section 150, a game calculation section 112, a display control section 114, a virtual camera control section 115, a drawing section 120, a sound control section 130, and a vibration control section 140.

The object space setting section 110 disposes objects (e.g., moving object, target, player's aircraft, enemy aircraft, and bullet) and various other objects (objects formed by a primitive such as a polygon, free-form surface, or subdivision surface) that indicate display objects such as a character, a building, a stadium, a car, a tree, a pillar, a wall, or a map (topography) in an object space. For example, the object space setting section 110 determines the position and the rotation angle of an object in a world coordinate system (the rotation angle is synonymous with orientation or direction; e.g., the rotation angle when the object is rotated clockwise around each of the X, Y, and Z axes in the world coordinate system), and disposes the object at the determined position (X, Y, Z) and the determined rotation angle (rotation angles around the X, Y, and Z axes).

The movement/motion processing section 150 calculates the movement/motion of an object. Specifically, the movement/motion processing section 150 causes an object to move or make a motion (animation) in the object space based on input information input by the player using the input device 20, a program (movement/motion algorithm), various types of data (motion data), and the like. More specifically, the movement/motion processing section 150 sequentially calculates object movement information (position, rotation angle, speed, or acceleration) and object motion information (position or rotation angle of each part that forms the object) every frame (1/60th of a second). The term "frame" used herein refers to a time unit for the object movement/motion process and the image generation process.

The game calculation section 112 performs various game calculation processes. For example, the game calculation section 112 starts the game when game start conditions have been satisfied, proceeds with the game, determines whether or not clear conditions corresponding to each game stage have been satisfied, finishes the game when game finish conditions have been satisfied, and performs an ending process when the final stage has been cleared.

The game calculation section 112 according to one embodiment of the invention causes the moving object to fire bullets based on shooting input information input by the player, determines whether or not the fired bullets have hit the target, and performs game calculations based on the determination result. The shooting input information corresponds to a second input signal (e.g., an input signal input using the button B) from the operation section 270. The game calculation section 112 determines whether or not the bullets have hit the target by checking whether or not a predetermined hit area of the bullet has hit a predetermined hit area of the target (i.e., hit check).

The display control section 114 displays a field-of-view image, and displays an image (radar map) that simply shows the relationship between the position of the moving object and a given area in a display area differing from the display area of the field-of-view image.

The virtual camera control section 115 controls a virtual camera (viewpoint) for generating an image viewed from a given (arbitrary) viewpoint in the object space. Specifically, the virtual camera control section 114 controls the position (X, Y, Z) or the rotation angle (e.g., the rotation angle of the virtual camera when the virtual camera is rotated clockwise around each of the X, Y, and Z axes) of the virtual camera in the world coordinate system.

The virtual camera control section 115 controls at least one of the position, the direction, and the angle of view of the virtual camera based on the moving route of the moving object.

The virtual camera control section 115 includes a first camera control section 116 that performs a first camera control process based on camera control data that defines a moving route of the virtual camera as a change in at least one of a relative position and a relative direction of the virtual camera with respect to the moving object, and at least one of a position and a direction of the moving object in the virtual three-dimensional space, and disposes the virtual camera in the virtual three-dimensional space based on a first setting value obtained by the first camera control process.

The camera control data may include data that defines a moving route that connects a given reference position in the local coordinate system of the moving object with a target position set for an item attached to the moving object, and the first camera control section 116 may move the virtual camera to the target position along the moving route when a given operation input has been performed on the item attached to the moving object.

The first camera control section 116 may start the first camera control process based on the start timing of the given operation input, and may finish the first camera control process based on the end timing of the given operation input.

When the given operation input has ended, the first camera control section 116 may return the state of the virtual camera to the state indicated by the camera control data when the given operation input has started from the state indicated by the camera control data when the given operation input has ended.

The camera control data may include data corresponding to a plurality of different moving routes connected to the item, and the first camera control section 116 may select the camera control data corresponding to one of the plurality of moving routes based on the position or the direction of the moving object or a given game parameter, and may perform the first camera control process using the selected camera control data.

The first camera control section 116 may set a given point along the moving route as at least one of a reproduction start position and a reproduction end position, and may move the virtual camera along a moving route specified by at least one of the reproduction start position and the reproduction end position.

The first camera control section 116 may set the moving direction along the moving route to the forward direction or the reverse direction, and may move the virtual camera along the moving route in the set moving direction.

The first camera control section 116 may reset the reproduction start position based on at least one of the distance and the positional relationship between the moving object and another moving object, an operation input, and a given parameter, and may move the virtual camera along the moving route.

The first camera control section 116 may calculates the relative position of the item as an operation target with respect to the moving object in real time based on input information, and may select the camera control data or change the reproduction end position of the moving route based on the calculated relative position.

The virtual camera control section 115 may further include a second camera control section 117 that continues a second camera control process that has been performed on the virtual camera before the first camera control process starts after the first camera control process has started, may blend the first setting value obtained by the first camera control process and a second setting value obtained by the second camera control process after the first camera control process has started, and may dispose the virtual camera in the virtual three-dimensional space based on a setting value obtained by blending the first setting value and the second setting value.

The virtual camera control section 115 may blend the first setting value and the second setting value while changing a blending ratio with the passage of time.

The second camera control section 117 may perform the second camera control process based on camera control data that defines a change in at least one of a relative position and a relative direction of the virtual camera with respect to the moving object, and at least one of a position and a direction of the moving object in the virtual three-dimensional space.

The virtual camera control section 115 may perform a transition process that moves the virtual camera from the position of the virtual camera in the local coordinate system of the moving object before the first camera control process is performed, to a given reference position in the local coordinate system of the moving object specified by the camera control data.

The first camera control section 116 may select one item when a given operation input has been performed on a plurality of items attached to the moving object, and may perform the first camera control process based on the camera control data corresponding to the selected item.

The drawing section 120 performs a drawing process based on the results of various processes (game calculation process) performed by the processing section 100 to generate an image (e.g., field-of-view image and radar map), and outputs the image to the display section 190.

When generating a three-dimensional game image, the drawing section 120 receives display object data (object data or model data) including vertex data (e.g., vertex position coordinates, texture coordinates, color data, normal vector, or alpha value) corresponding to each vertex that defines the display object (object or model), and performs a vertex process based on the vertex data included in the display object data. When performing the vertex process, the drawing section 120 may perform a vertex generation process (tessellation, surface division, or polygon division) for dividing the polygon, if necessary. In the vertex process, the drawing section 120 performs a vertex movement process and a geometric process such as coordinate transformation (world coordinate transformation or camera coordinate transformation), clipping, perspective transformation, or a light source process, and changes (updates or adjusts) the vertex data relating to the vertices that form the display object based on the processing results. The drawing section 120 then performs a rasterization process (scan conversion) based on the vertex data changed by the vertex process so that the surface of the polygon (primitive) is linked to pixels. The drawing section 120 then performs a pixel process (fragment process) that draws pixels that form the image (fragments that form the display screen). In the pixel process, the drawing section 120 determines the drawing color of each pixel that forms the image by performing various processes such as a texture reading (texture mapping) process, a color data setting/change process, a translucent blending process, and an anti-aliasing process, and outputs (draws) the drawing color of the object subjected to perspective transformation to the drawing buffer 174 (i.e., a buffer that can store image information corresponding to each pixel; VRAM or rendering target). Specifically, the pixel process includes a per-pixel process that sets or changes the image information (e.g., color, normal, luminance, and alpha value) corresponding to each pixel. An image viewed from the virtual camera (given viewpoint) set in the object space is thus generated. When a plurality of virtual cameras (viewpoints) are provided, the drawing section 130 may generate an image so that images (divided images) viewed from the respective virtual cameras are displayed on one screen.

The vertex process and the pixel process performed by the drawing section 120 may be implemented by hardware that enables a programmable polygon (primitive) drawing process (i.e., programmable shader (vertex shader and pixel shader)) based on a shader program written using a shading language. The programmable shader enables a programmable per-vertex process and per-pixel process to increase the degree of freedom relating to the drawing process so that the representation capability is significantly improved as compared with a fixed hardware drawing process.

The drawing section 120 performs a geometric process, a texture mapping process, a hidden surface removal process, an alpha blending process, and the like when drawing the display object.

In the geometric process, the drawing section 120 performs a coordinate transformation process, a clipping process, a perspective transformation process, a light source calculation process, and the like on the display object. The display object data (e.g., display object's vertex position coordinates, texture coordinates, color data (luminance data), normal vector, or alpha value) after the geometric process (after perspective transformation) is stored in the main storage section 172.

The term "texture mapping process" refers to a process that maps a texture (texel value) stored in the storage section 170 on the display object. Specifically, the drawing section 120 reads a texture (surface properties such as color (RGB) and alpha value) from the storage section 170 using the texture coordinates set (assigned) corresponding to the vertices of the display object, for example. The drawing section 120 then maps the texture (i.e., two-dimensional image) on the display object. In this case, the drawing section 120 performs a pixel-texel association process, a bilinear interpolation process (texel interpolation process), and the like.

The drawing section 120 may perform a hidden surface removal process by a Z-buffer method (depth comparison method or Z-test) using a Z-buffer (depth buffer) that stores the Z-value (depth information) of the drawing pixel. Specifically, the drawing section 120 refers to the Z-value stored in the Z-buffer when drawing the drawing pixel corresponding to the primitive of the object. The drawing section 120 compares the Z-value stored in the Z-buffer with the Z-value of the drawing pixel of the primitive. When the Z-value of the drawing pixel is the Z-value in front of the virtual camera (e.g., a small Z-value), the drawing section 120 draws the drawing pixel and updates the Z-value stored in the Z-buffer with a new Z-value.

The term "alpha blending" refers to a translucent blending process (e.g., normal alpha blending, additive alpha blending, or subtractive alpha blending) based on the alpha-value (A-value). In the normal alpha blending process, the drawing section 120 calculates a color obtained by blending two colors by performing a linear interpolation process using the alpha-value as the degree of blending.

The term "alpha-value" refers to information that can be stored corresponding to each pixel (texel or dot), such as additional information other than the color information that indicates the luminance of each RGB color component. The alpha-value may be used as mask information, translucency (equivalent to transparency or opacity), bump information, or the like.

The sound control section 130 causes at least one of the speaker 230 of the input device 20 and the speaker 192 to output sound stored in the storage section 170 based on the results of various processes (e.g., game calculation process) performed by the processing section 100.

The vibration control section 140 causes the vibration section 240 of the input device 20 to vibrate via the communication section 196 and the communication section 260 based on the results of various processes (e.g., game calculation process) performed by the processing section 100.

The game system according to one embodiment of the invention may be a system dedicated to a single-player mode that allows only one player to play the game, or may be a system provided with a multi-player mode that allows a plurality of players to play the game.

When a plurality of players play the game, a single main device 10 may perform the game calculation process and the image generation process based on information (e.g., the accelerations detected by the acceleration sensor 210 and the input signal output from the operation section 270) transmitted from the input device 20 used by each player, and display the generated image on the display section used by each player.

The main devices 10 respectively used by a plurality of players may be connected via a network (transmission line or communication line), and each main device 10 may perform the game calculation process and the image generation process based on information transmitted from the input device 20, and display the generated image on the display section.

The information storage medium 180 (computer-readable medium) stores a program, data, and the like. The function of the information storage medium 180 may be implemented by hardware such as an optical disk (CD or DVD), a magneto-optical disk (MO), a magnetic disk, a hard disk, a magnetic tape, or a memory (ROM).

The display section 190 outputs an image generated by the processing section 100. The function of the display section 190 may be implemented by hardware such as a CRT display, a liquid crystal display (LCD), an organic EL display (OELD), a plasma display panel (PDP), a touch panel display, or a head mount display (HMD).

The speaker 192 outputs sound reproduced by the sound control section 130. The function of the speaker 192 may be implemented by hardware such as a speaker or a headphone. The speaker 192 may be a speaker provided in the display section. For example, when a television set (home television set) is used as the display section, the speaker 192 may be a speaker provided in the television set.

The light source 198 is an LED or the like. The light source 198 is disposed corresponding to the display section 190. In one embodiment of the invention, a plurality of light sources (light source R and light source L) are provided. The light source R and the light source L are disposed at a given interval.

2. First Embodiment

2.1 Item Camera Control Process (i.e., First Camera Control Process)

An item camera control process (i.e., first camera control process) is described below taking an example of the item camera control process that is performed when operating a machine gun (i.e., an item attached to a moving object) of a player's moving object (i.e., moving object) in a flight shooting game.

In the flight shooting game according to the first embodiment, a player's moving object (e.g., fighter aircraft) moves in a virtual three-dimensional space (object space), and attacks (shoots down or defeats) a target moving object (e.g., enemy aircraft) using a machine gun (cannon) installed in the player's moving object based on input information input by the player.

The flight shooting game according to the first embodiment includes a normal battle mode, a proximate battle mode, various other modes, various events, and the like. A virtual camera is disposed in the virtual three-dimensional space by controlling the virtual camera based on each mode or event. In the normal battle mode, a first-person viewpoint or third-person viewpoint camera control process is performed.

In the proximate battle mode, a follow-up control process that causes the player's moving object to follow the target moving object is performed. Specifically, the player's moving object is caused to follow the target moving object based on the previous moving route of the target moving object. In the proximate battle mode, a camera control process is performed so that a plurality of fighter aircrafts that fight a proximate battle are displayed within a screen.

The item camera control process (camera control process based on an event) is performed when an operation input that operates the machine gun (i.e., item) has been performed. Note that the item camera control process may be performed when an operation input that operates an item has been performed, and another condition has been satisfied (e.g., a given game parameter (e.g., the strength parameter of the enemy aircraft (target)) has satisfied a given condition).

The item camera control process (i.e., first camera control process) is performed based on camera control data that defines the moving route of the virtual camera as a change in at least one of a relative position and a relative direction of the virtual camera with respect to the moving object, and at least one of a position and a direction (at least one of the position and the direction) of the moving object in the virtual three-dimensional space.

Figure 2:
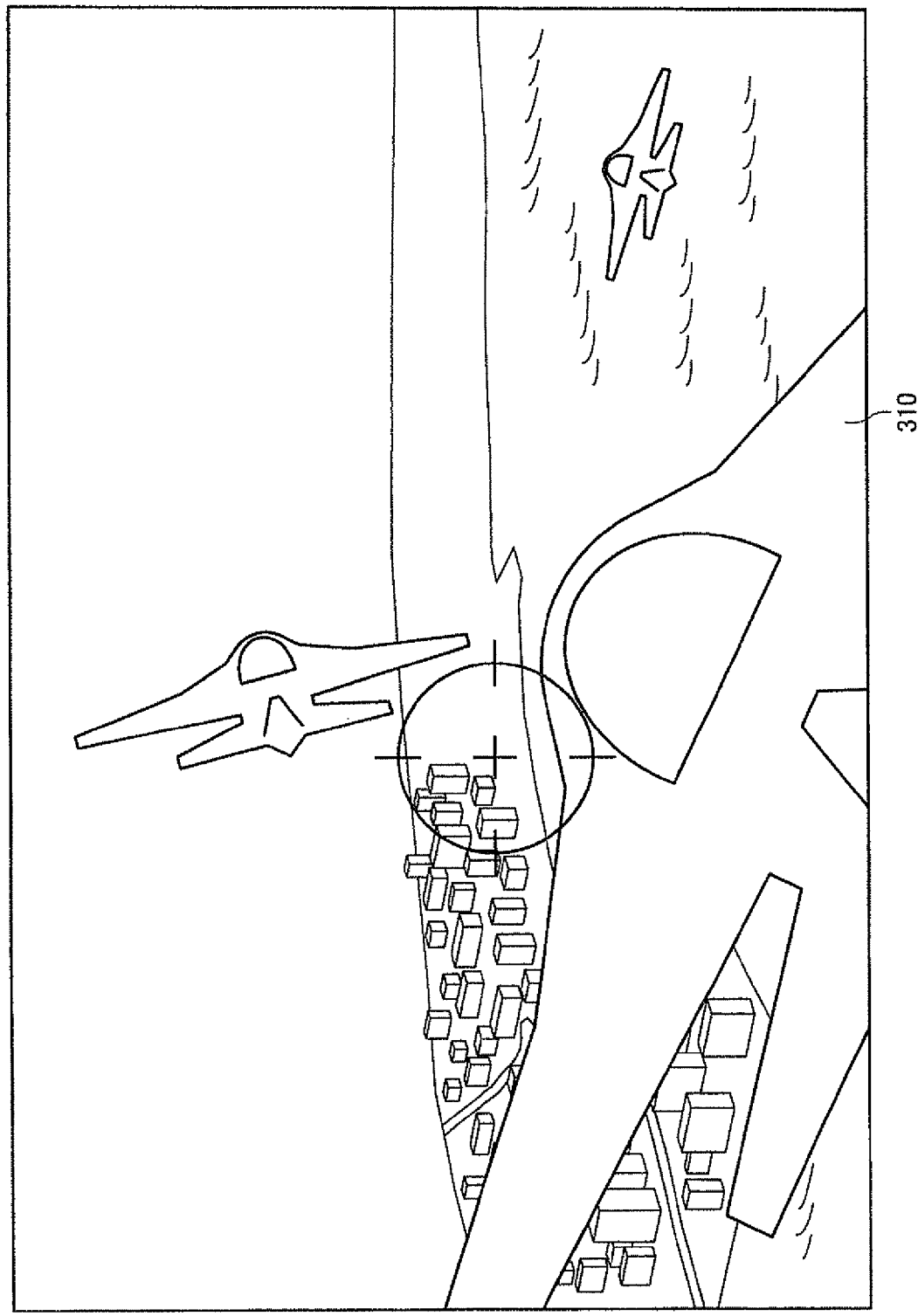
FIG. 2 is a diagram illustrating an example of an image in a third-person viewpoint mode.
Figure 3:
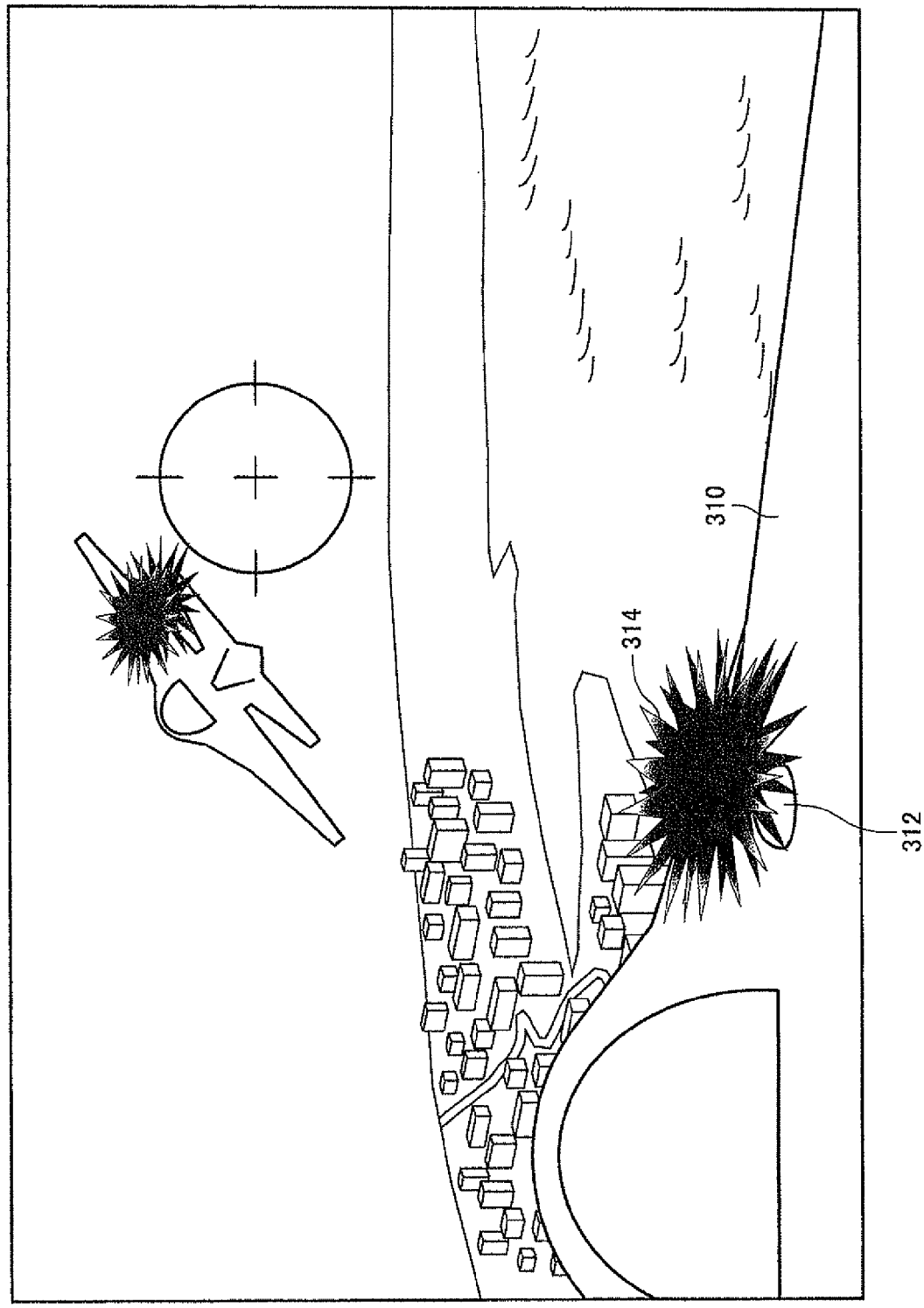
FIG. 3 is a diagram illustrating an example of an image when an item camera control process is performed.

FIG. 2 is a diagram illustrating an example of an image in a third-person viewpoint mode, and FIG. 3 is a diagram illustrating an example of an image when the item camera control process is performed.

In the third-person viewpoint mode, the virtual camera is normally disposed diagonally behind the player's moving object, and moves to follow the player's moving object. Therefore, an image that observes a player's moving object 310 from behind is displayed (see FIG. 2). When an operation input that operates a machine gun 312 has been performed during the third-person viewpoint mode, the virtual camera approaches the machine gun 312, and a state 314 in which bullets are launched from the machine gun 312 is brought into close-up (i.e., an impressive camera effect is achieved).

2.2 Camera Control Data

The camera control data is described below taking an example of the camera control data used for the item camera control process.

Figure 4:
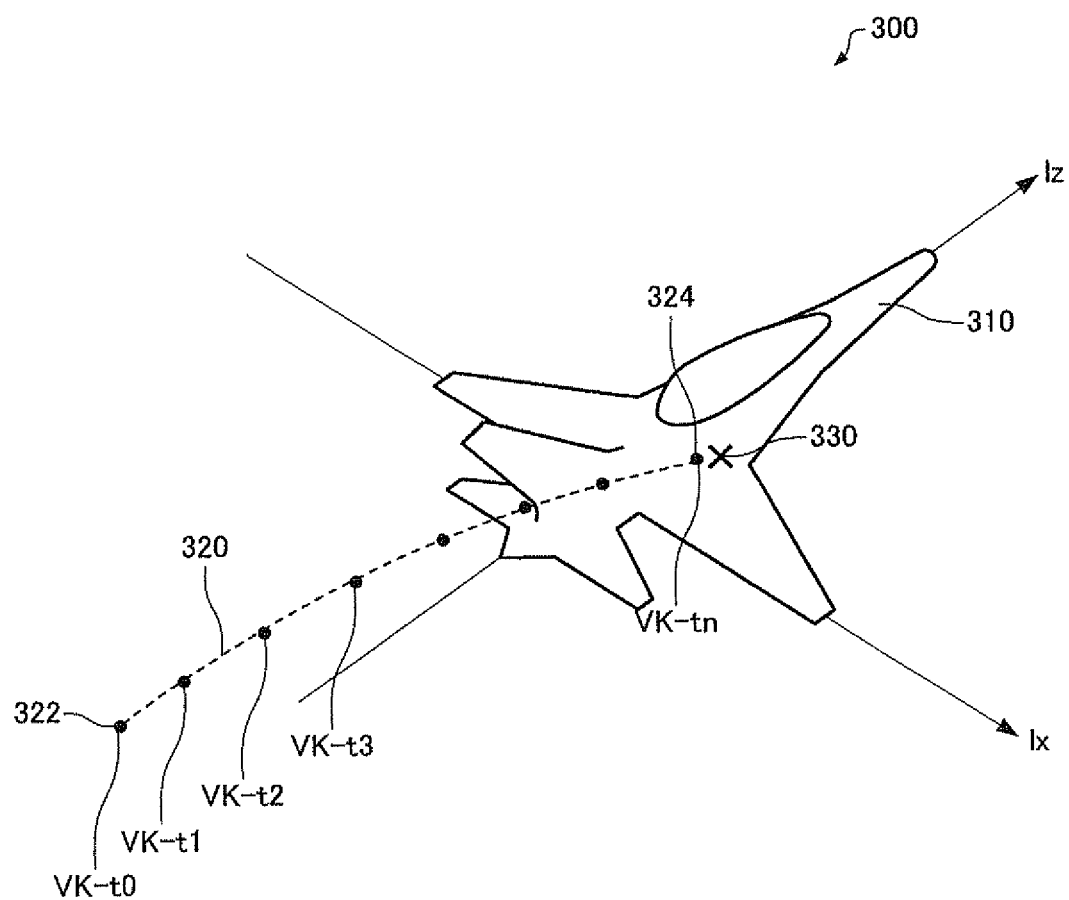
FIG. 4 is a diagram illustrating an example of camera control data.

FIGS. 4 and 5 are diagrams illustrating an example of the camera control data.

Camera control data 350 indicates the behavior (e.g., position, direction (rotation), and angle of view) of the virtual camera within a given period (t0 to tn), and includes data that indicates a change in at least one of a position 360, a direction 370, and an angle of view 380 of the virtual camera within a given period (t0 to tn). Note that the camera control data 350 may include data that indicates a change in each of the position 360, the direction 370, and the angle of view 380. The camera control data 350 may also include another parameter (e.g., depth of field) of the virtual camera.

As illustrated in FIG. 4, the position 360 and the direction 370 of the virtual camera respectively refer to the position (position coordinates in a local coordinate system) and the direction of the virtual camera in a local coordinate system 300 in which a representative point of the moving object 310 is the origin, and the direction of the moving object 310 coincides with a given axial direction (Z-axis direction lz in this example).

A trajectory 320 illustrated in FIG. 4 indicates the moving route of the virtual camera in the local coordinate system 300. Reference numeral 330 indicates the position of the machine gun (i.e., an item attached to a moving object) of the player's moving object. A starting point 322 of the trajectory 320 may be a given reference position, and an end point 324 of the trajectory 320 may be a target position (i.e., a position away from the machine gun in a given direction by a given distance) that is set for the position 330 of the machine gun. The given reference position used as the starting point 322 of the trajectory may be a local position of a second camera control process (e.g., a virtual camera control process in a normal third-person viewpoint mode) that has been performed before starting the first camera control process. In this case, since the position of the camera when starting the first camera control process is the same as the position of the camera during the second camera control process that has been performed before starting the first camera control process, the viewpoint can be smoothly switched.

The moving route (trajectory) 320 is set based on the shape of the model of the moving object. Specifically, the moving route (trajectory) 320 is set so that the moving route (trajectory) 320 does not intersect the moving object 310 in a state in which the moving object 310 is disposed at the origin of the local coordinate system. This makes it possible to implement an effective camera control process without performing a complex control process (e.g., without determining whether or not the moving route of the virtual camera intersects the moving object 310).

The virtual camera moves along the moving route (trajectory) 320 over a given period (t0 to tn) from a position VK-t0 (starting point) at the time t0 to a position VK-tn (end point) at the time tn. The camera control data may indicate the trajectory 320 by a function of time, or may discretely define the coordinate values of the positions at the times t0, t1, . . . (see the position 360 in FIG. 5).

The control data that indicates the direction (rotation) may indicate the direction (rotation) by a function of time, or may discretely define the directions (rotations) at the times t0, t1, . . . (see the direction (rotation) 370 of the camera control data 350 in FIG. 5).

The control data that indicates the angle of view may indicate the angle of view by a function of time, or may discretely define the angles of view at the times t0, t1, . . . (see the angle of view 380 of the camera control data 350 in FIG. 5).

When the position, the direction, or the angle of view does not change for a given period (t0 to tn), only one invariable value may be defined for that period.

2.3 Calculation of Camera Setting Value

A camera setting value calculation technique using the first camera control process is described below taking the item camera control process as an example.

Figure 6:
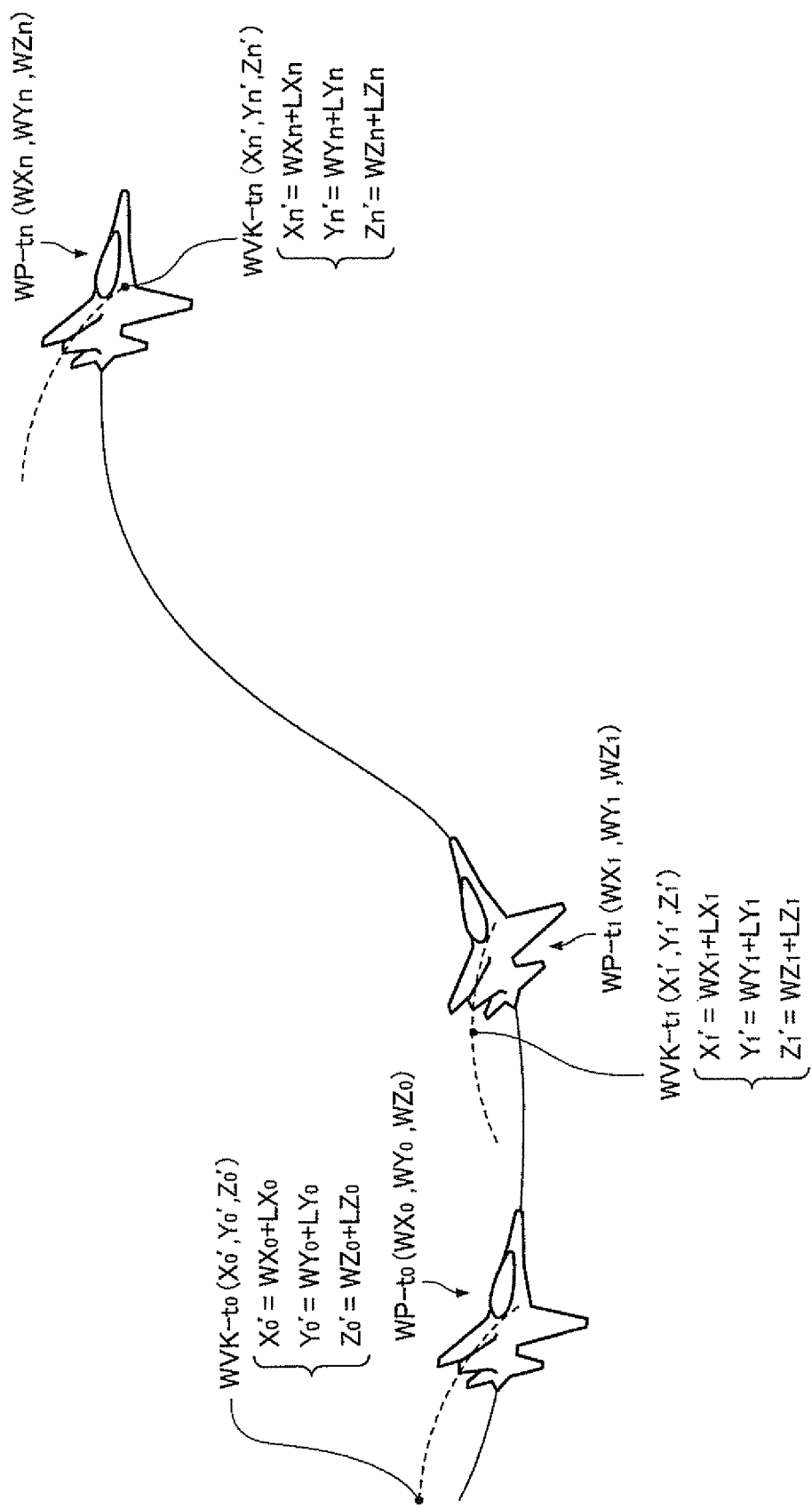
FIG. 6 is a diagram illustrating a technique for calculating at least one of a position and a direction of a virtual camera in a world coordinate system.
Figure 7:
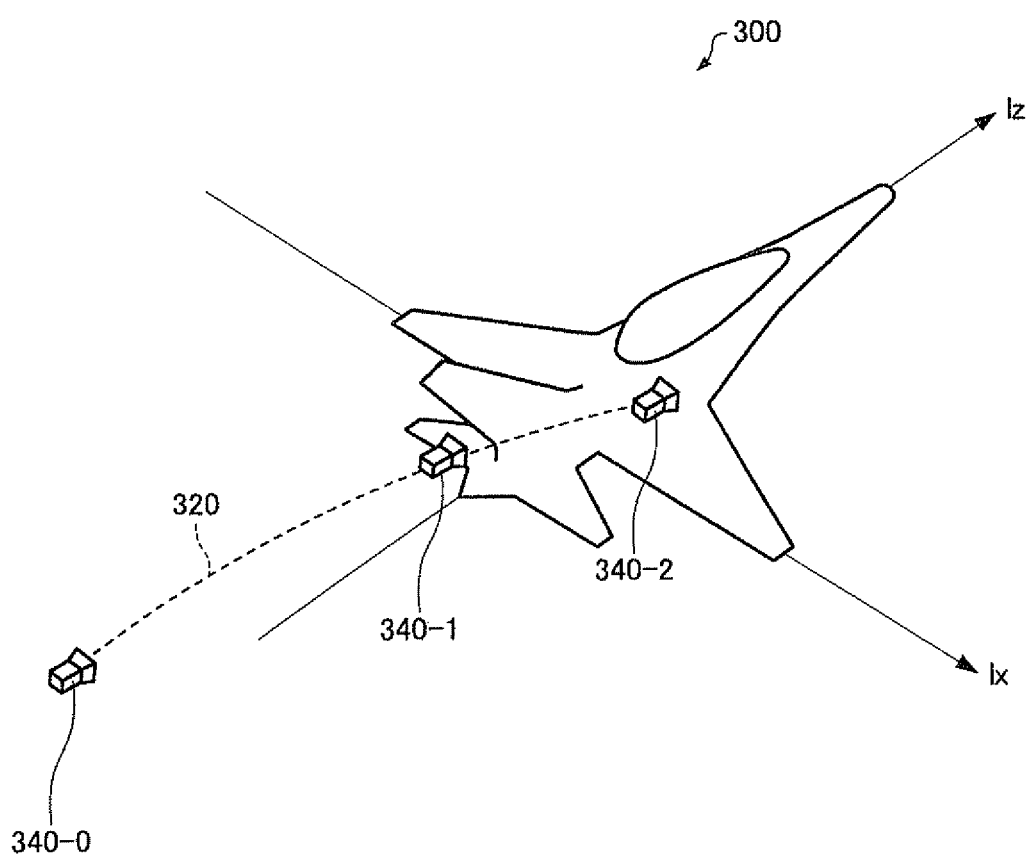
FIG. 7 is a diagram illustrating the position of a camera corresponding to an image generated by an item camera control process.

FIG. 6 is a diagram illustrating a technique for calculating at least one of a position and a direction of the virtual camera (first setting value) in a world coordinate system based on the camera control data and the position of the moving object.

WP-t0, WP-t1, . . . , and WP-tn indicate the positions of the moving object in the world coordinate system (virtual three-dimensional space) at the times t0, t1, . . . , and tn. The position coordinates at the positions WP-t0, WP-t1, . . . , and WP-tn in the world coordinate system are (WX0, WY0, WZ0), (WX1, WY1, WZ1), . . . , and (WXn, WYn, WZn). In this case, the position coordinates (X'0, Y'0, Z'0), (X'1, Y'1, Z'1), . . . , and (X'n, Y'n, Z'n) of the positions WVK-t0, WVK-t1, . . . , and WVK-tn of the virtual camera at the times t0, t1, and tn may be calculated by summing up the position coordinates (WX0, WY0, WZ0), (WX1, WY1, WZ1), . . . , and (WXn, WYn, WZn) of the player's moving object at the times t0, t1, and tn and position coordinates (LX0, LY0, LZ0), (LX1, LY1, LZ1), and (LXn, LYn, LZn) of the virtual camera in the local coordinate system at the times t0, t1, . . . , and tn.

2.4 Example of Camera Effect of Item Camera Control Process

A specific example of the camera effect of the first camera control process is described below taking the item camera control process (i.e., first camera control process) as an example.

Figure 8A:
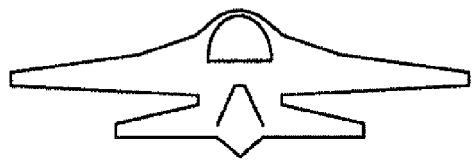
FIGS. 8A to 8C are diagrams illustrating examples of an image generated by an item camera control process.
Figure 8B:
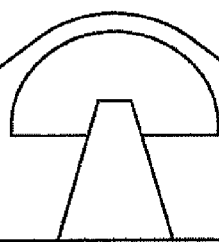
Figure 8C:
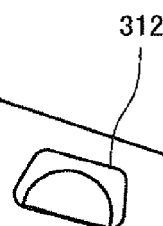

FIGS. 7 and 8A to 8C are diagrams illustrating examples of an image generated by the item camera control process. The item camera control process causes the virtual camera to move along the moving route 320 of the moving object 310 in the local coordinate system 300 (see FIG. 7). FIGS. 8A, 8B, and 8C respectively illustrate viewpoint images generated when the virtual camera is disposed at positions 340-0, 340-1, and 340-2 illustrated in FIG. 7. Specifically, the item camera control process causes the virtual camera to approach the machine gun 312 of the player's moving object, so that the machine gun 312 is displayed in close-up (see FIG. 8C).

2.5 Item Operation Period and Camera Control Data Reproduction Control

An item operation period and camera control data reproduction control when performing the first camera control process are described below taking the item camera control process as an example.

FIGS. 9A, 9B, 10A, and 10B are diagrams illustrating the moving route of the virtual camera during the item camera control process (i.e., first camera control process).

Figure 9A:
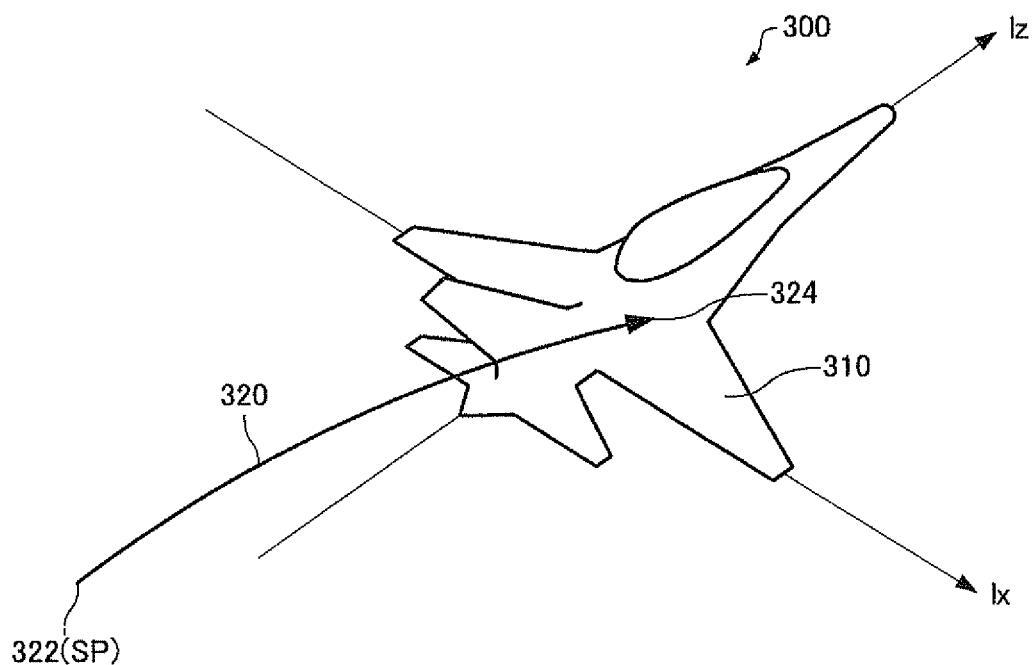
FIGS. 9A and 9B are diagrams illustrating the moving route of a virtual camera.
Figure 9B:
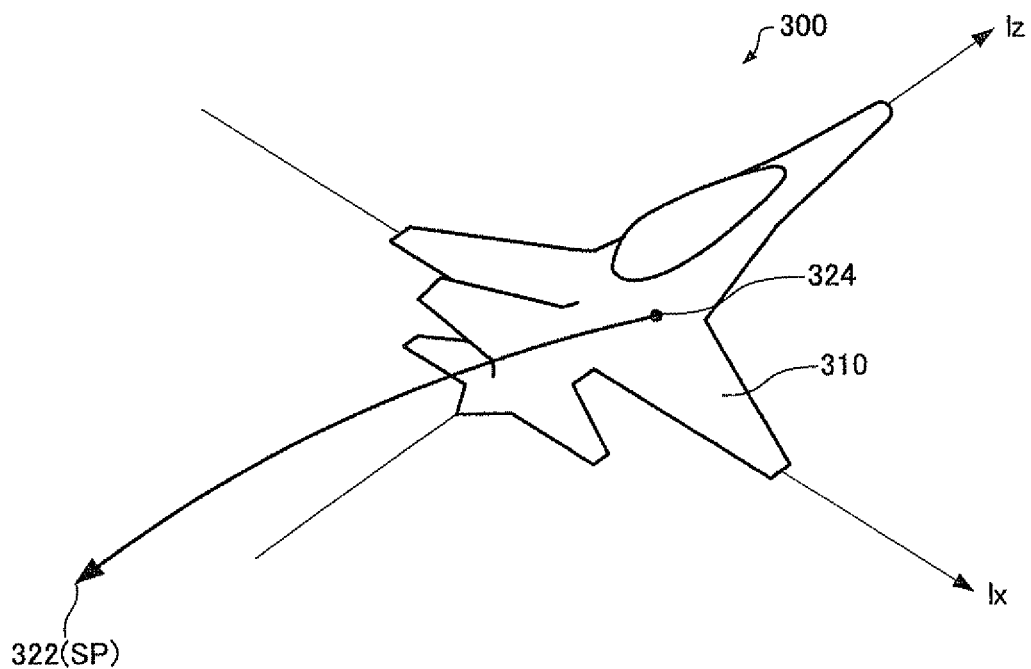

The camera control data defines data (data about the position, direction, angle of view, and the like) that indicates the trajectory 320 of the virtual camera within a given period in time series. As illustrated in FIG. 9A, the trajectory of the virtual camera can be reproduced by reproducing the data from the starting point 322 to the end point 324 of the trajectory 320 in time series. The following description is given on the assumption that the given period is n seconds.

The data corresponding to the given period (n seconds) may necessarily be reproduced when a given operation input has been performed. In this case, the virtual camera moves from the starting point 322 to the end point 324 along the moving route (trajectory 320) (see FIG. 9A) when a given operation input has been performed. The virtual camera may be moved back to the starting point 322 from the end point 324 along the trajectory 320 at a given timing after the virtual camera has moved from the starting point 322 to the end point 324 (see FIG. 9B).

The value defined corresponding to each point may be used as the direction (rotation) of the virtual camera when the virtual camera is moved back to the starting point 322 from the end point 324. In this case, since the virtual camera moves back while maintaining its direction, the virtual camera moves away from the item in the same line-of-sight direction as that when the virtual camera approaches the item.

The item camera control process may be performed only in a period in which a given operation input is performed, and may be suspended when the given operation input has ended.

Figure 10A:
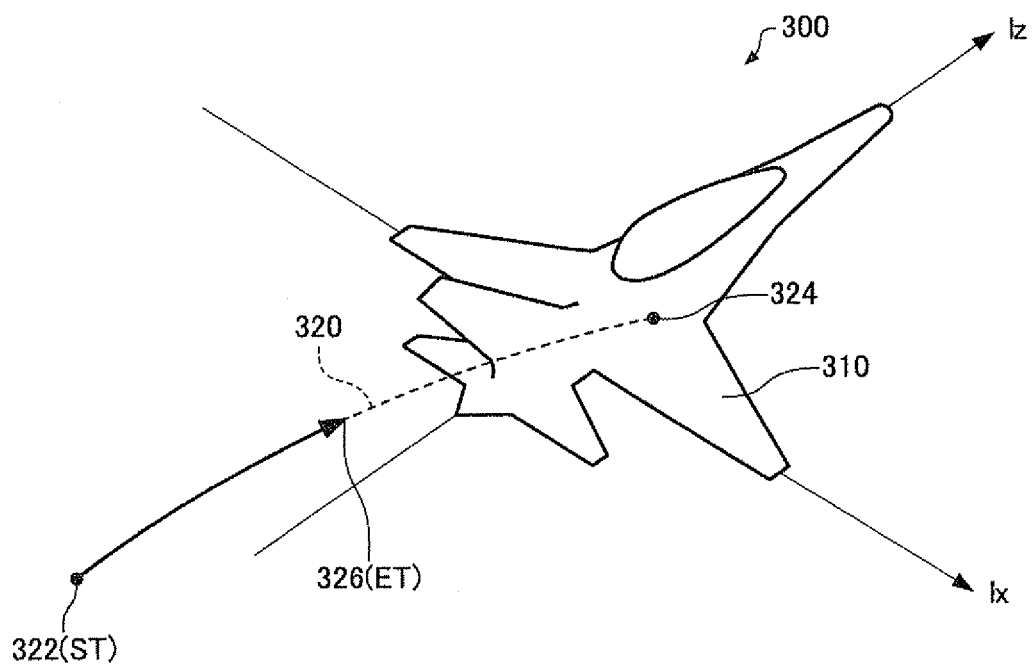
FIGS. 10A and 10B are diagrams illustrating the moving route of a virtual camera.
Figure 10B:
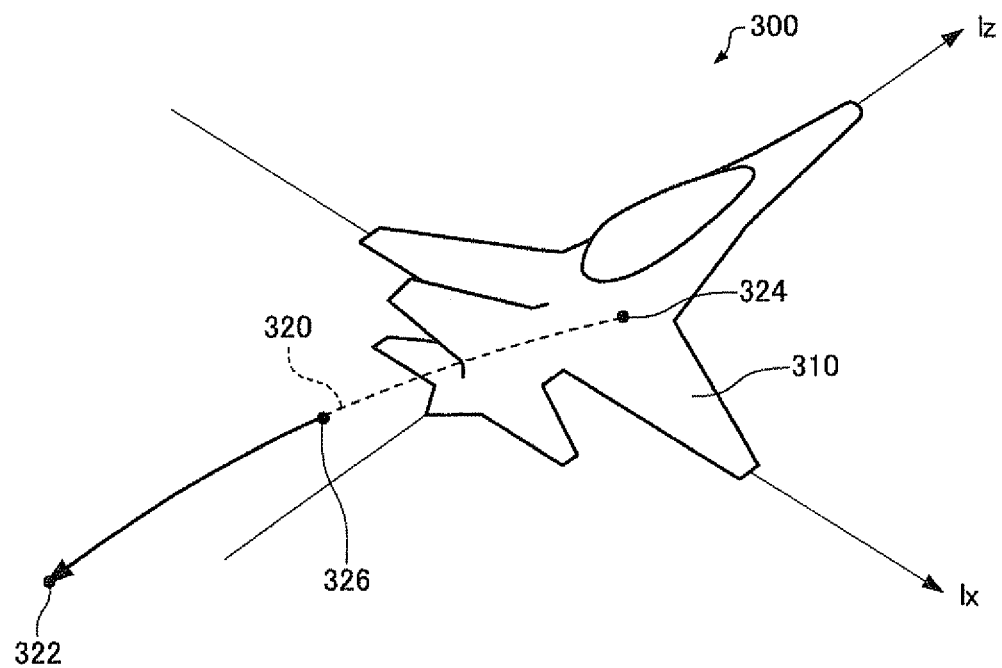

For example, when a given operation input has been performed for n/2nd of a second, the data may be reproduced from the starting point 322 at a start timing ST of the given operation input, and reproduction of the data may be terminated at a halfway point 326 along the trajectory at an end timing ET of the given operation input (see FIG. 10A).

When the end timing has occurred before the end point of the trajectory has been reached, reproduction of the data may be terminated at the end timing. When the end timing has not occurred when the end point of the trajectory has been reached, the data defined corresponding to the end point 324 of the trajectory may be continuously reproduced until the end timing occurs.

When the given operation input has ended, the state of the virtual camera may be returned to the state (starting point 322) indicated by the camera control data when the given operation input has started from the state (halfway point 326) indicated by the camera control data when the given operation input has ended.

For example, when the camera control data defines data (data about the position, direction, angle of view, and the like) that indicates the trajectory of the virtual camera within a given period in time series, the virtual camera may be returned to the position at the start timing of the operation input by reproducing the camera control data from the reproduction start position to the starting point of the trajectory in the reverse direction along the time axis using the position 326 along the trajectory when the operation input has ended as the return control reproduction start position.

The moving direction along the moving route may be set to the forward direction or the reverse direction, and the virtual camera may be moved along the moving route in the set moving direction in this manner.

2.6 Moving Route

A case of performing the first camera control process while selecting one moving route from a plurality of moving routes is described below taking the item camera control process as an example.

Figure 11:
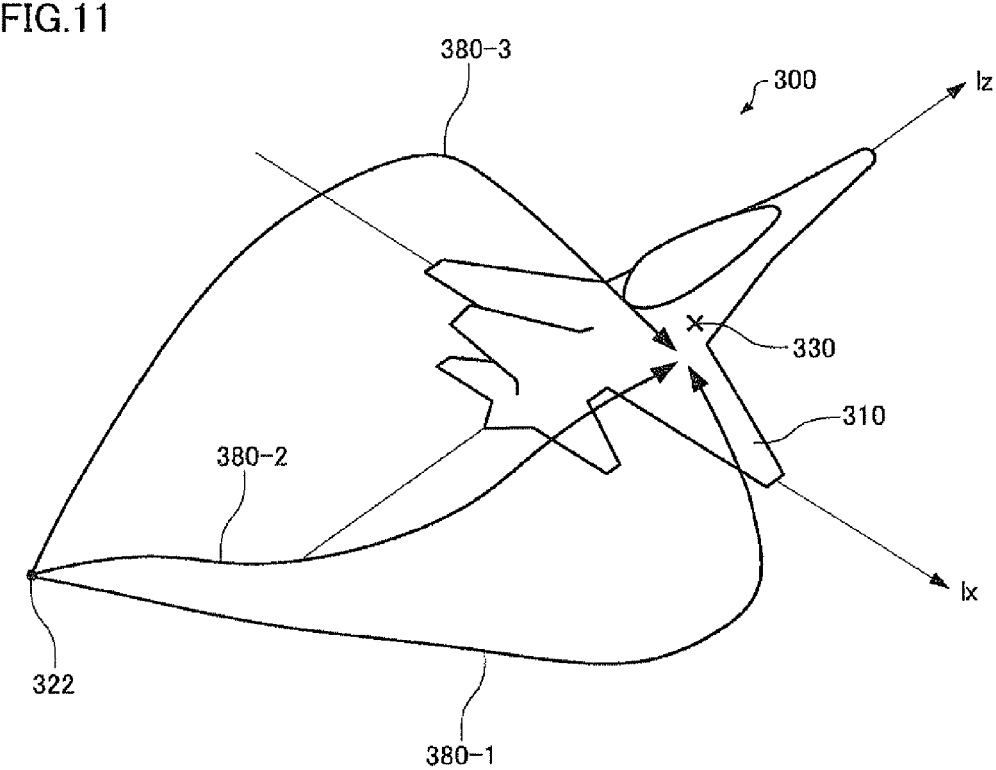
FIG. 11 is a diagram illustrating an example in which a plurality of moving routes are set for one item.

FIG. 11 illustrates an example in which a plurality of moving routes are set for one item.

As illustrated in FIG. 11, a plurality of different moving routes 380-1, 380-2, and 380-3 may be set for the item 330 of the moving object 310, and camera control data corresponding to each moving route may be provided.

The camera control data corresponding to one of the moving routes may be selected based on the position and the direction of the moving object, the relative positional relationship and the distance between the moving object and the item, the attribute of the moving object, and a given game parameter.

This makes it possible to perform the item camera control process in various ways corresponding to an identical item.

The camera control data may be selected randomly, or may be selected based on a given algorithm. The relationship between the current position or direction of the moving object in the virtual three-dimensional space and the path to be selected may be defined in advance. For example, when the flight area of the moving object is an area where a number of obstacles are present, an almost linear path 380-2 may be selected. When the altitude (Y-coordinate value) of the moving object is low, it is likely that a number of obstacles (e.g., land features and buildings) are present around the moving object. Therefore, the path may be selected depending on the altitude of the moving object. When the altitude of the moving object is low, the camera control data for which the path is set within a given range from the moving object may be selected.

This prevents a situation in which the virtual camera collides against an obstacle. The path may be selected depending on the attribute of the moving object. When another moving object is positioned near the moving object, the moving route that does not intersect the other moving object may be selected taking account of the positional relationship between the moving object and the other moving object.

Figure 12:
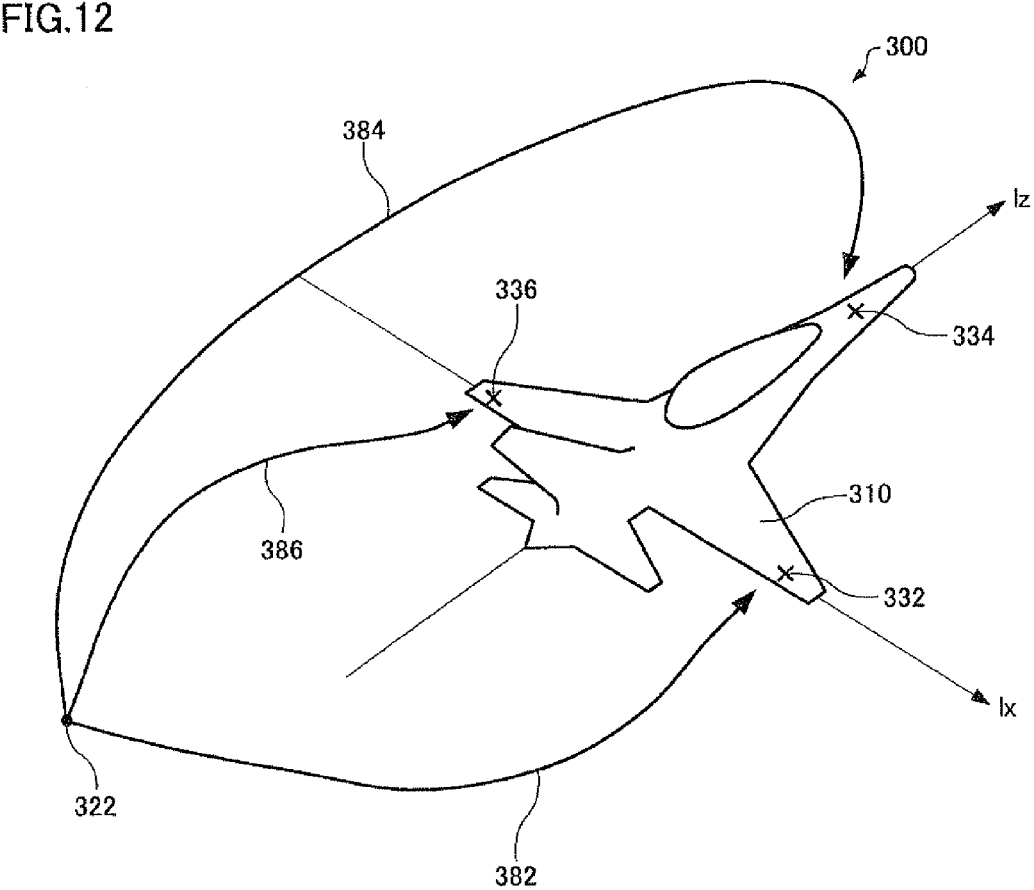
FIG. 12 is a diagram illustrating a path setting example when a plurality of items are attached to one moving object.

FIG. 12 illustrates a path setting example when a plurality of items are attached to one moving object.

When a plurality of items 332, 334, and 336 are attached to the moving object 310, paths 382, 384, and 386 are respectively set for the items 332, 334, and 336. In this case, the moving route is selected depending on the item for which an operation input has been performed.

When an operation input has been performed for one of the items, the moving route corresponding to that item is selected. When an operation input has been performed for a plurality of items 332 and 336, for example, the moving route corresponding to one of the items 332 and 336 may be selected. The moving route may be selected randomly, or may be selected based on the parameter (e.g., hit score) of the item, or may be selected based on the positional relationship between the moving object and another moving object.

The moving route may also be selected depending on the altitude or the flight area of the moving object in the same manner as in FIG. 11.

2.7 Variable Control of Reproduction Start Position and Reproduction End Position of Camera Control Data A configuration that variably sets (controls) the reproduction start position, the reproduction end position, and the reproduction direction of the camera control data when performing the first camera control process is described below taking the item camera control process as an example.

Figure 13A:
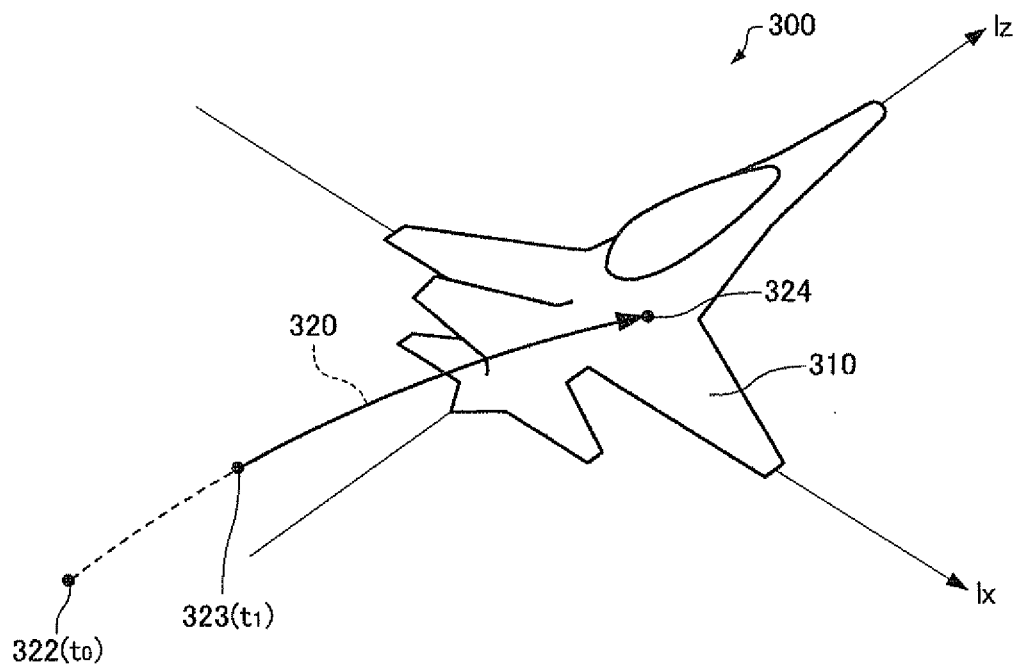
FIGS. 13A and 13B are diagrams illustrating a reproduction start position and a reproduction end position of camera control data.
Figure 13B:
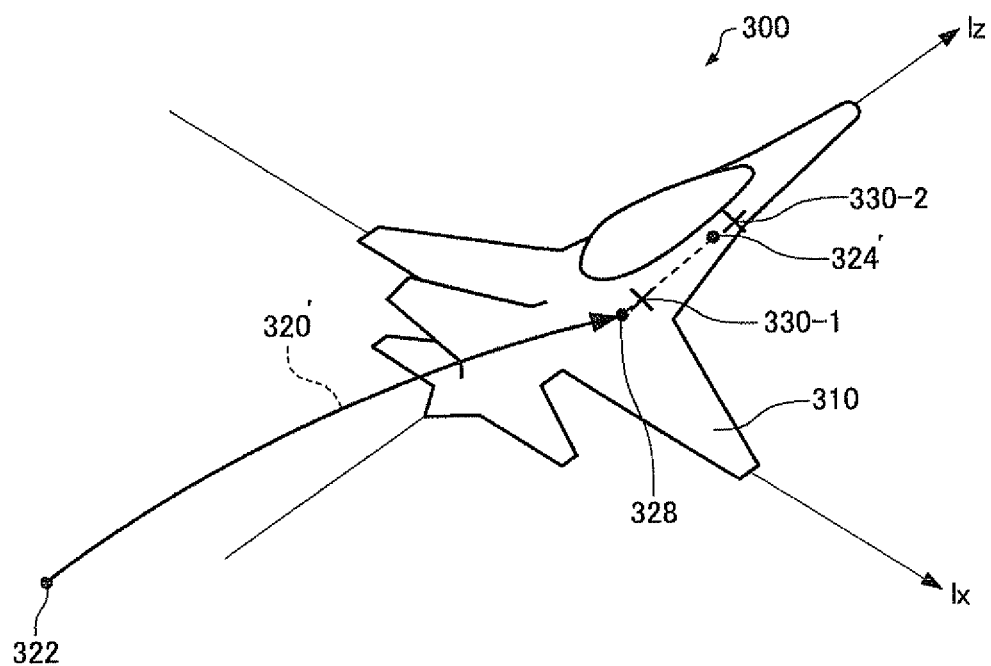

FIGS. 13A and 13B are diagrams illustrating the reproduction start position and the reproduction end position of the camera control data.

In the first embodiment, the reproduction start position and the reproduction end position of the camera control data can be variably set. Specifically, a given point along the moving route is set as at least one of the reproduction start position and the reproduction end position, and the virtual camera is moved along a moving route specified by at least one of the reproduction start position and the reproduction end position.

FIG. 13A illustrates an example in which the camera control data is reproduced from a halfway point 323 (i.e., reproduction start position) along the moving route 320, and reproduction of the camera control data ends at the end point 324 of the moving route 320. When the camera control data defines data in time series from the starting point 322 to the end point 324 (see FIG. 5), the data at the starting point is defined at the time t0, and the data at the halfway point 323 is defined at the time t1, the virtual camera can be moved from the halfway point 323 to the end point 324 of the moving route by setting the position at the time t1 to be the reproduction start position. This makes it possible to control the camera along a plurality of moving routes that differ in starting point using the same camera control data.

For example, the reproduction start position may be determined based on the local position of the virtual camera before the item camera control process is performed. The moving route 320 may include a position before the item camera control process is performed (e.g., the local position of the virtual camera in the third-person viewpoint mode).

FIG. 13B illustrates an example of a path that includes target positions corresponding to a plurality of items.

A path 320' that includes the starting point 322 and an end point 324' includes target positions corresponding to a plurality of items 330-1 and 330-2 attached to the moving object. In this case, the reproduction end position may be selected based on the operation target item. For example, when the item 330-2 is the operation target item, the camera control data may be reproduced along the entire path from the starting point 322 to the end point 324. When the item 330-1 is the operation target item, the reproduction end position may be set to a point 328 along the path that corresponds to the item 330-1, and the camera control data may be reproduced along the path from the starting point 322 to the reproduction end position 328.

2.8 Modification of Item Camera Control Process

An example of the item camera control process when the position of the item can be changed relative to the moving object is described below.

Figure 14:
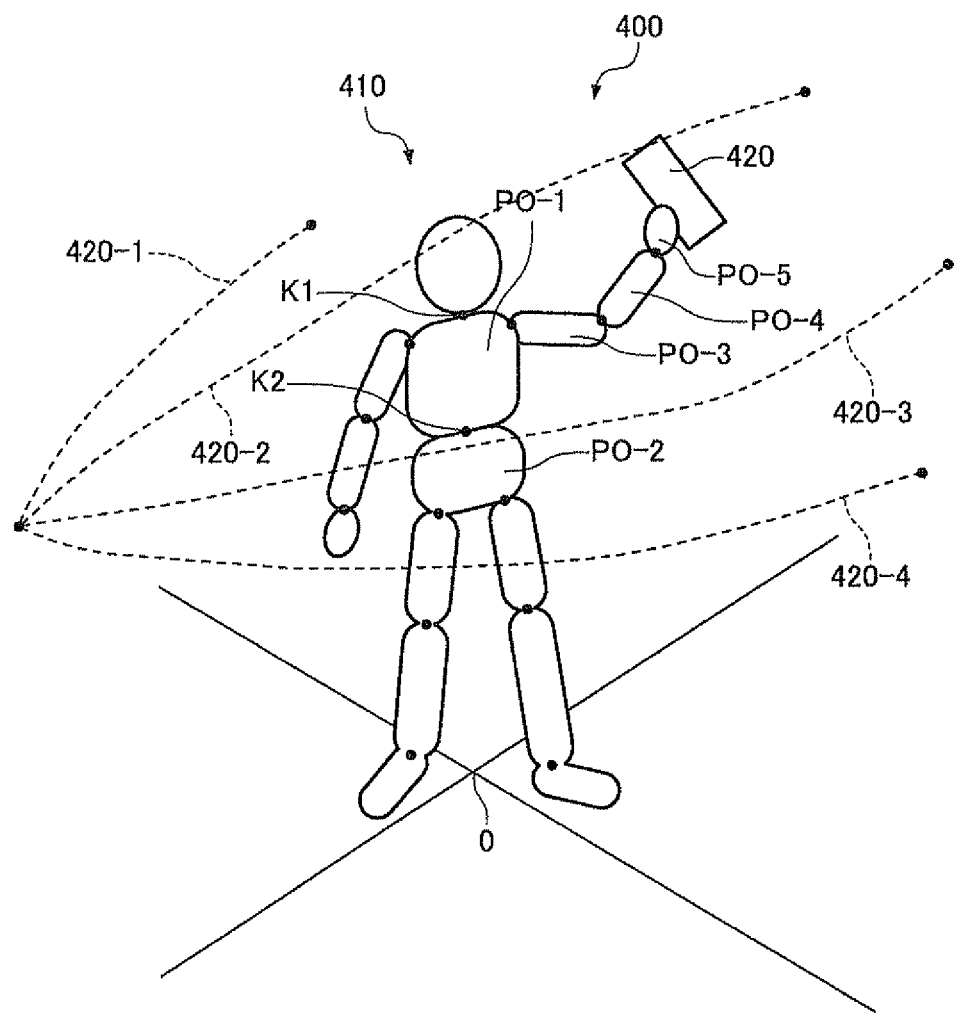
FIG. 14 is a diagram illustrating a moving route that is set for an item attached to a moving object that is formed by connecting a plurality of part objects via joints.

FIG. 14 is a diagram illustrating a moving route that is set for an item attached to a moving object that is formed by connecting a plurality of part objects via joints.

A moving object 410 is formed by connecting a plurality of part objects PO-1, PO-2, . . . via joints K1, K2, . . . , and holds an item 420. The item 420 moves to follow the moving object 410. Since the rotation of the item 420 relative to the joints K1, K2, . . . of each part object changes, the position of the item 420 in a local coordinate system 400 is not fixed with respect to the origin O of the local coordinate system 400, and changes along with the movement of the part objects PO-1, PO-2, . . . connected via the joints K1, K2, . . . .

Specifically, when the moving object 410 includes a plurality of joints K1, K2, . . . , and the motion of the moving object 410 is controlled, the relative position of the item 420 with respect to a representative point (point having position coordinates) of the moving object 410 changes. In this case, a plurality of paths 420-1, 420-2, 420-3, and 420-4 may be provided in advance. The relative position of the item 420 (operation target) with respect to the moving object 410 may be calculated in real time based on input information and the motion data, and the path may be selected based on the calculated relative position. The reproduction end position of the selected path may also be changed.

2.9 A Plurality of Camera Control Processes

A case of simultaneously performing a plurality of camera control processes including the first camera control process, and determining at least one of a position and a direction of the virtual camera while reflecting the plurality of camera control processes is described below taking the item camera control process as an example of the first camera control process.

Figure 15:
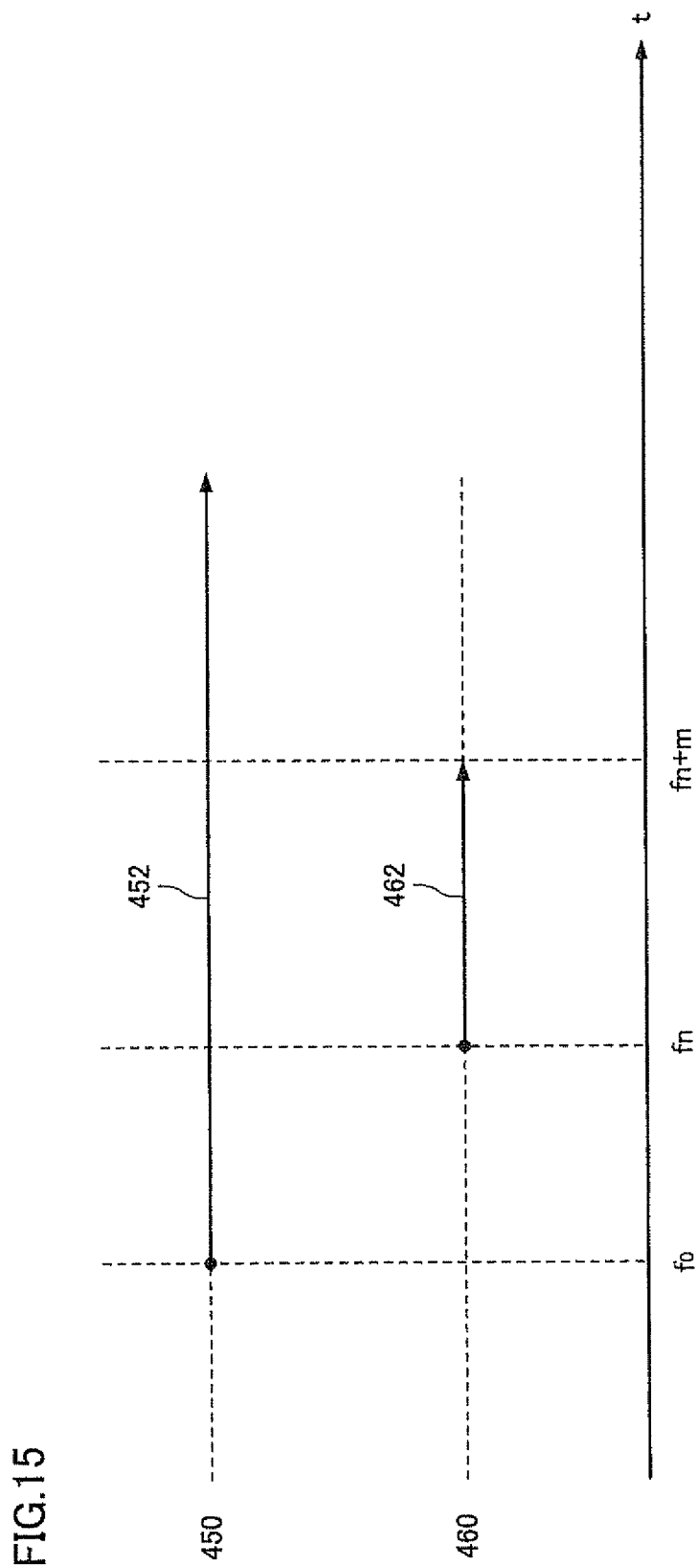
FIG. 15 is a diagram illustrating a blend control process on a plurality of camera setting values.

FIGS. 15 to 17 are diagrams illustrating a blend control process on a plurality of camera setting values.

FIG. 15 is a timing chart illustrating a plurality of camera control processes along a time axis t. Specifically, a plurality of camera control processes are simultaneously performed, and the virtual camera is controlled based on a setting value calculated by blending the setting value obtained by each camera control process. Reference numeral 452 indicates a period in which a second camera control process 450 is performed, and reference numeral 462 indicates a period in which a first camera control process 460 is performed.

The second camera control process 450 is a camera control process that causes the virtual camera to follow the moving object in the third-person viewpoint mode during a normal battle. The first camera control process 460 is the item camera control process.

The second camera control process 450 (i.e., the camera control process in the third-person viewpoint mode during a normal battle) is performed from a time f0, and another camera control process is not performed from the time f0 to a time fn. Therefore, a second setting value (e.g., position, direction, and angle of view) obtained by the second camera control process is set to the virtual camera from the time f0 to the time fn.

When a given item operation input has been performed at the time fn, the first camera control process starts. The first camera control process is then performed for m seconds, and ends at a time fn+m.

The first camera control process 460 and the second camera control process 450 are simultaneously performed from the time fn to the time fn+m, and the first setting value and the second setting value are respectively obtained by the first camera control process and the second camera control process. The setting value of the virtual camera from the time fn to the time fn+m may be blending the first setting value and the second setting value.

Figure 16A:
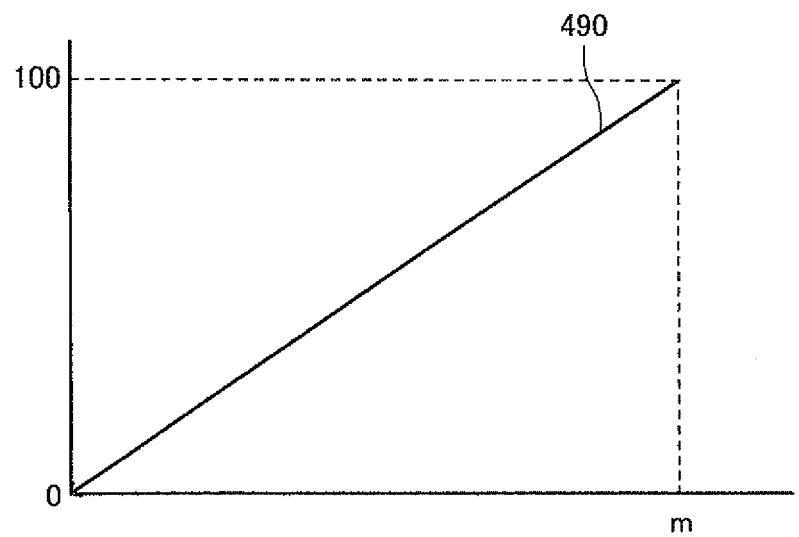
FIGS. 16A and 16B are diagrams illustrating a blend control process on a plurality of camera setting values.
Figure 16B:
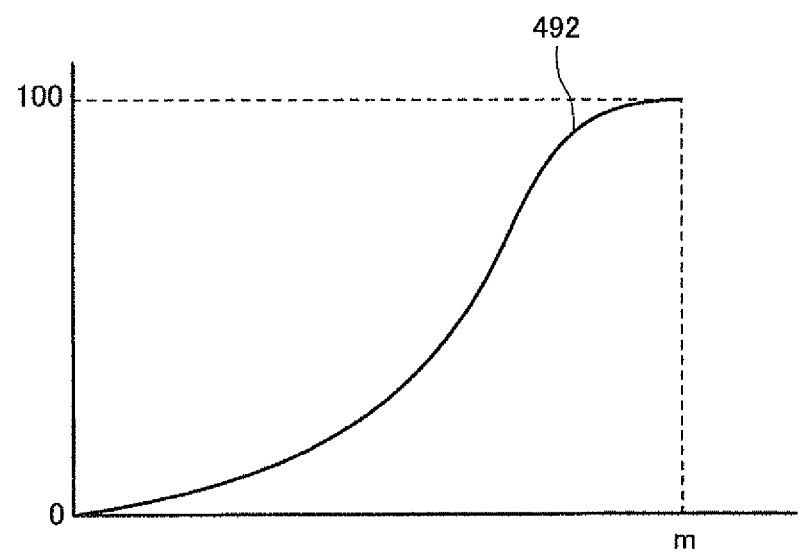

FIGS. 16A and 16B are graphs illustrating a change in blending ratio of the first setting value and the second setting value with respect to time. The horizontal axis indicates time, and the vertical axis indicates the blending ratio. Since the first camera control process is defined as data that defines the behavior of the virtual camera for m seconds, graphs 490 and 492 illustrated in FIGS. 16A and 16B indicate the blending ratio from the start timing of the first camera control process to a timing when m seconds has elapsed. As illustrated in FIGS. 16A and 16B, the blending ratio changes with respect to time.

In FIG. 16A, the ratio of the first setting value increases from 0% to 100% the passage of time according to a linear function. In FIG. 16B, the ratio of the first setting value increases from 0% to 100% the passage of time according to a given function.

In FIGS. 16A and 16B, the ratio of the first setting value becomes a maximum when m seconds has elapsed from the start timing of the first camera control process. Therefore, the effect of the first camera control process increases with the passage of time in a period from the time fn to the time fn+m.

FIG. 17 is a diagram illustrating a blending example of the first setting value and the second setting value.

In this example, the second camera control process is performed based on the camera control data provided in advance, and the placement data (at least one of the position and the direction) about the moving object in the virtual three-dimensional space.

Reference numeral 320-1 indicates the moving route of the moving object 310 in the local coordinate system 300 that is indicated by the camera control data for the first camera control process, and reference numeral 320-2 indicates the moving route of the moving object 310 in the local coordinate system 300 that is indicated by the camera control data for the second camera control process.

Reference numeral 320-3 indicates a moving route in the local coordinate system 300 obtained by blending the moving route 320-1 and the moving route 320-2 in the local coordinate system using the blending ratio that changes with the passage of time. The coordinate values of the virtual camera in the world coordinate system within a given period (t0 to tn) can be calculated by summing up the coordinate values (LWi, LYi, LZi) (i=0, 1, 2, ..., n) of the blended route 320-3 in the local coordinate system at the time ti and the coordinate values (WXi, WYi, WZi) (i=0, 1, 2, ..., n) of the moving object in the world coordinate system.

When blending the first setting value and the second setting value as described above, the moving route 320-1 in the local coordinate system 300 based on the first camera control process and the moving route 320-2 in the local coordinate system 300 based on the second camera control process may be blended in the local coordinate system 300, and the resulting moving route may be converted into a value in the world coordinate system.

2.10 Transition Process

A transition process that moves the virtual camera from the position of the virtual camera in the local coordinate system of the moving object before the first camera control process is performed, to a given reference position in the local coordinate system of the moving object specified by the camera control data is described below taking the item camera control process as an example of the first camera control process.

Figure 23:
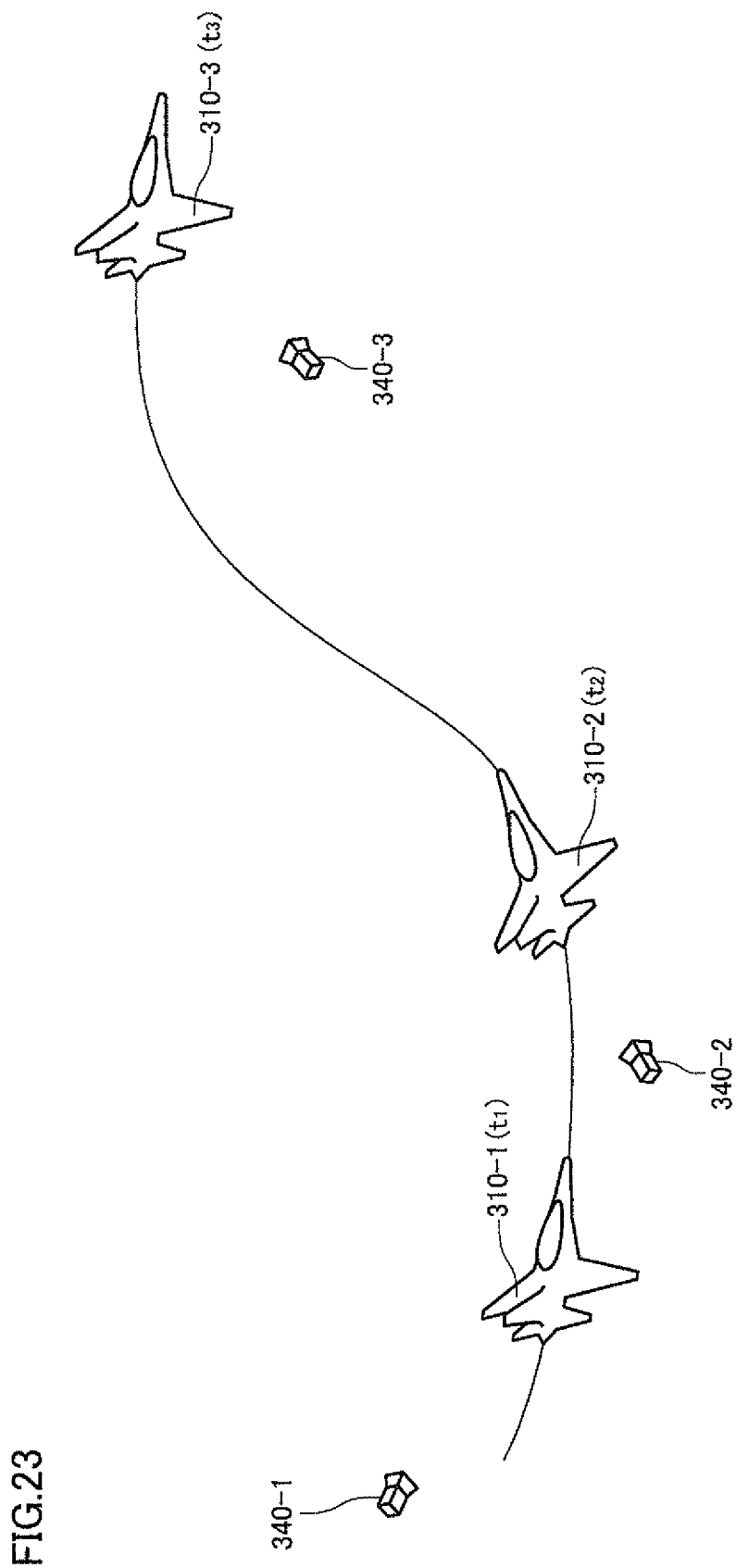
FIG. 23 is a diagram illustrating a transition process.

FIG. 23 is a diagram illustrating the positional relationship between the moving object and the virtual camera before the item camera control process (i.e., first camera control process) is performed. FIG. 23 illustrates the positional relationship between the moving object and the virtual camera at times t1, t2, and t3 during a third camera control process.

The item camera control process is performed when a given item operation input has been performed during the third camera control process. As illustrated in FIG. 23, the third camera control process causes the virtual camera 340 to follow the moving object 310. The relative position and direction (rotation) of the virtual camera 340 with respect to the moving object 310 are not fixed. Specifically, the position and the direction (rotation) of the virtual camera 340 in the local coordinate system of the moving object 310 change depending on the position, the direction, and the speed of the moving object 310 in the world coordinate system, the positional relationship and the distance between the moving object and another moving object (e.g., an enemy moving object targeted by the moving object), and the like.

In this case, the position and the direction (rotation) of the virtual camera in the local coordinate system of the moving object differ depending on whether a given item operation input has been performed at the time t1, a given item operation input has been performed at the time t2, or a given item operation input has been performed at the time t3.

Figure 24:
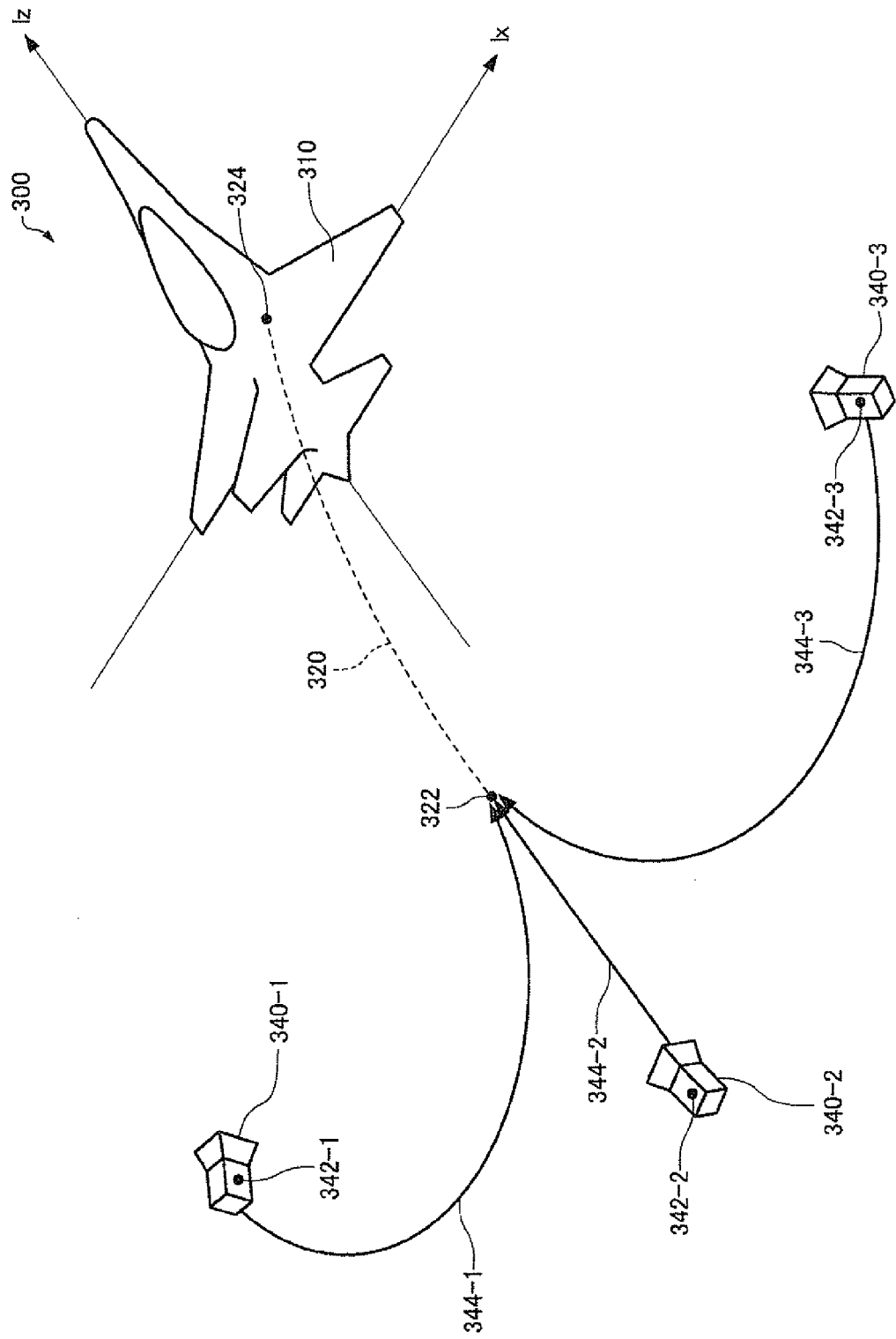
FIG. 24 is a diagram illustrating a transition process.

FIG. 24 is a diagram illustrating the transition process. Reference numeral 320 indicates the moving route of the virtual camera based on the item camera control process in the local coordinate system 300 of the moving object 310. Reference numeral 322 indicates the starting point (i.e., given reference position) of the moving route (trajectory) 320.

When the reproduction start position is not set, the camera control data is reproduced from the starting point 322 (i.e., given reference position).

The virtual camera 340-1 is located at a position 342-1 when a given item operation input has been performed at the time t1. The virtual camera 340-2 is located at a position 342-2 when a given item operation input has been performed at the time t2. The virtual camera 340-3 is located at a position 342-3 when a given item operation input has been performed at the time t3. Specifically, the virtual camera is located at a position differing from the given reference position. The transition process moves the virtual camera from the position of the virtual camera immediately before a given item operation input is performed to the given reference position within a given period (IT).

For example, when a given item operation input has been performed at the time t1, the virtual camera may be moved from the local position 342-1 of the virtual camera (i.e., the position of the virtual camera in the local coordinate system of the moving object) at the time t1 to the given reference position 322 within a given period (IT) along a given moving route 344-1. When a given item operation input has been performed at the time t2, the virtual camera may be moved from the local position 342-2 of the virtual camera at the time t2 to the given reference position 322 within a given period (IT) along a given moving route 344-2. When a given item operation input has been performed at the time t3, the virtual camera may be moved from the local position 342-3 of the virtual camera at the time t3 to the given reference position 322 within a given period (IT) along a given moving route 344-3.

Each of the given moving routes 344-1, 344-2, and 344-3 is a line segment that connects the local position of the virtual camera at the time t1, t2, or t3 and the given reference position. The given moving routes 344-1, 344-2, and 344-3 are determined in real time based on the local position 342-1, 342-2, or 342-3 of the virtual camera when the operation input has been performed. The given moving routes 344-1, 344-2, and 344-3 may be determined so that the path of the line segment is a given function that passes through the above two points. The angle of view of the virtual camera may be determined so that the moving object is displayed within an image.

According to the above process, the virtual camera moves to the given reference position within a given period (IT) when a given item operation input has been performed, and ten approaches the item along the moving route 320 based on the item camera control process. Therefore, even if a given item operation input has been performed during the camera control process that changes the relative position of the virtual camera 340 with respect to the moving object 310, a smooth and seamless camera effect can be implemented.

When a given item operation input has ended, the state of the virtual camera may be returned to the state before the transition process is performed from the state indicated by the camera control data when the given operation input has ended. For example, when a given item operation input has been performed at the time t1, and the virtual camera is positioned at the end point 324 of the moving route 320 when the given operation input has ended, the virtual camera may be moved back to the starting point 322 along the moving route 320, and may be moved back to the local position 342-1 at the time, t1 along the moving route 344-1.

Figure 20:
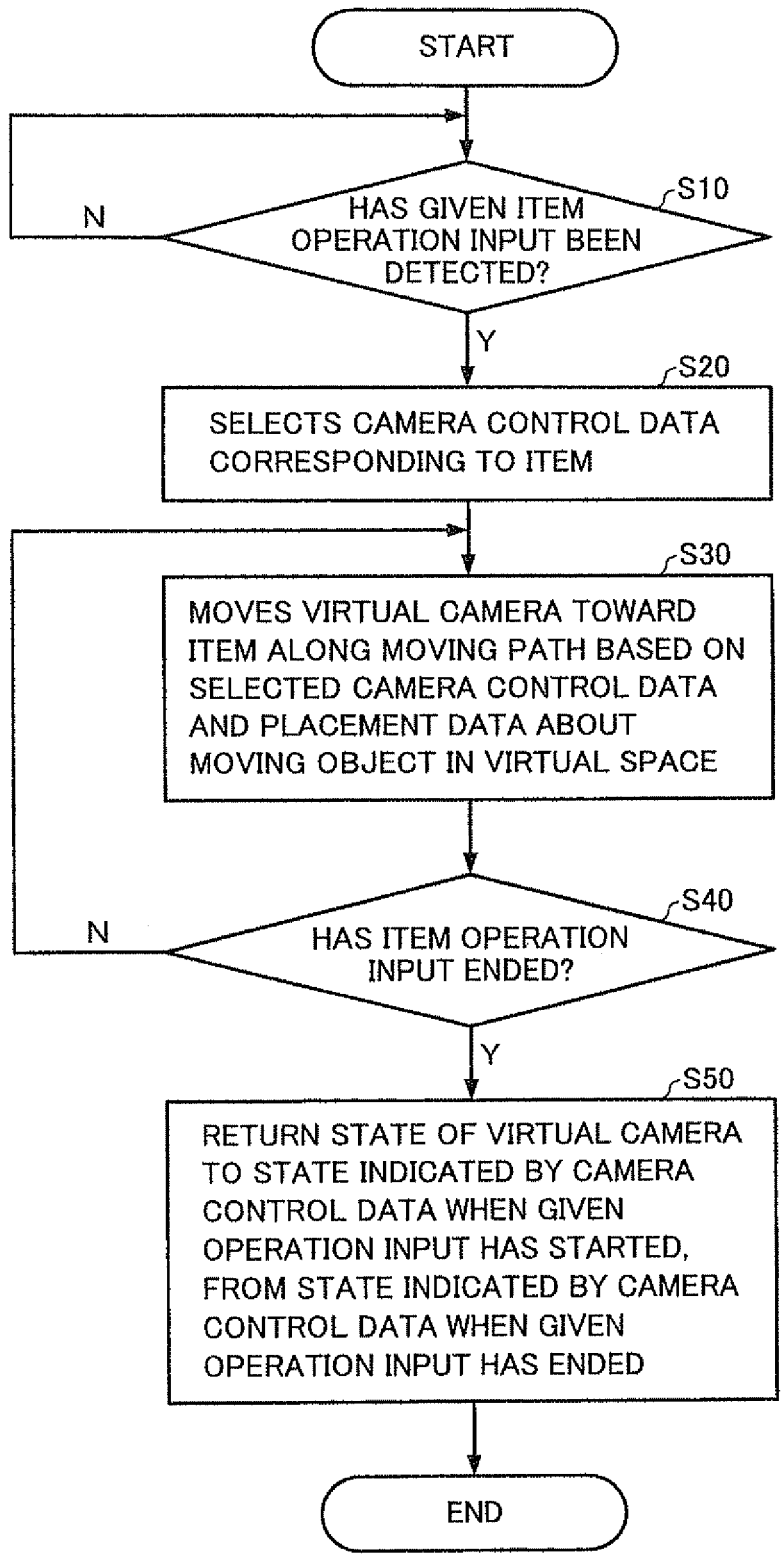
FIG. 20 is a flowchart illustrating the flow of a camera control process according to a first embodiment.

FIG. 20 is a flowchart illustrating the flow of the camera control process (item camera control process) according to the first embodiment.

The following process is performed when a given item operation input has been detected (step S10). The camera control data for the first camera control process corresponding to the item is selected (step S20). The virtual camera is moved toward the item along the moving route based on the selected camera control data and the placement data about the moving object in the virtual three-dimensional space (step S30).

When it has been detected that the given item operation input has ended (step S40), the state of the virtual camera is returned to the state indicated by the camera control data when the given operation input has started from the state indicated by the camera control data when the given operation input has ended (step S50).

Figure 22:
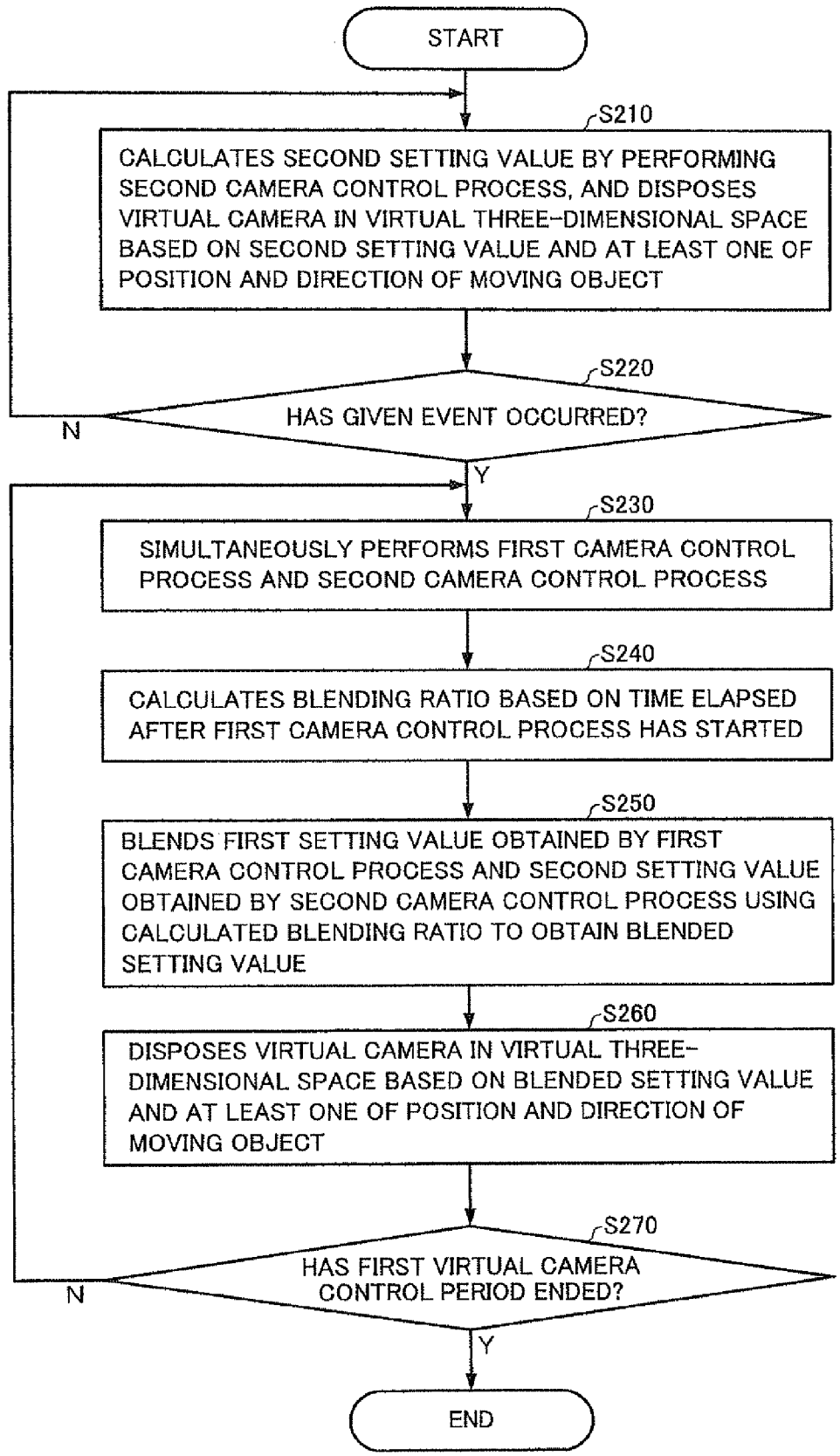
FIG. 22 is a flowchart illustrating the flow of a camera control process according to the first embodiment.

FIG. 22 is a flowchart illustrating the flow of the camera control process according to the first embodiment.

The second setting value is calculated by performing the second camera control process before a given event occurs (e.g., before a given operation input is performed), and the virtual camera is disposed in the virtual three-dimensional space based on the second setting value and at least one of a position and a direction of the moving object (step S210). When a given event has occurred (step S220), the following process is repeated until the first virtual camera control period ends (step S270).

Specifically, the first camera control process and the second camera control process are simultaneously performed (step S230), and the blending ratio is calculated based on the time elapsed after the first camera control process has started (step S240). The first setting value obtained by the first camera control process and the second setting value obtained by the second camera control process are blended using the calculated blending ratio to obtain a blended setting value (step S250). The virtual camera is disposed in the virtual three-dimensional space based on the blended setting value and at least one of a position and a direction of the moving object (step S260).

3. Second Embodiment

A technique that reflects an operation input in the first camera control process is described below. The following description is given taking an example in which the first camera control process is a camera control process (proximate battle camera control process) that causes the player's moving object to follow the target moving object in the proximate battle mode.

Figure 18A:
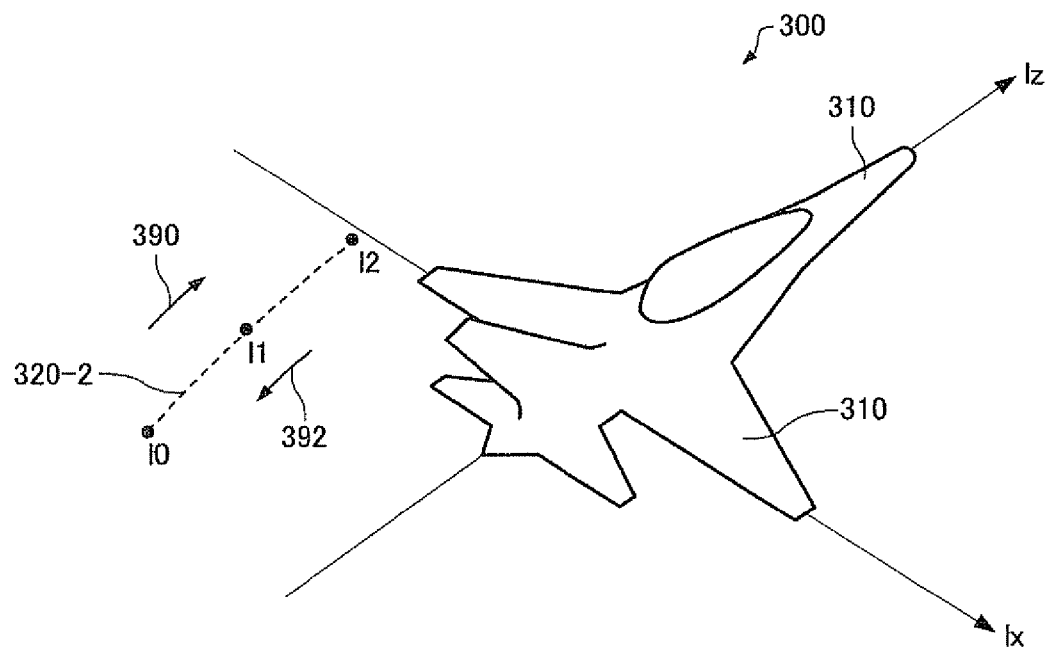
FIGS. 18A and 18B are diagrams illustrating an example in which an operation input is reflected in a first camera control process.
Figure 18B:
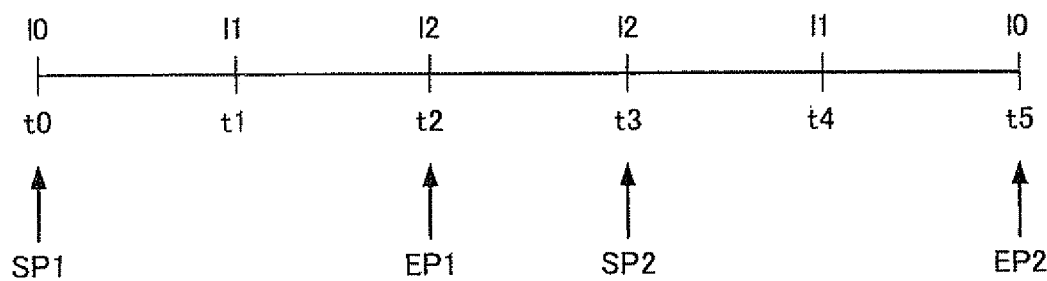

FIGS. 18A and 18B are diagrams illustrating an example in which an operation input is reflected in the first camera control process.

Reference numeral 320-2 in FIG. 18A indicates the moving route of the moving object 310 in the local coordinate system 300 defined by the camera control data used for the first camera control process. FIG. 18B is a diagram illustrating the relationship between the time axis (t0 to t5) of the camera control data and position data. The following description is given taking the position data as an example. Note that the following description similarly applies to the direction (rotation) and the angle of view. The camera control data is defined so that the virtual camera moves in a forward direction 390 along the path 320-2 (10→11→12) at times t0 to t2, and moves in a reverse direction 392 along the path 320-2 (12→11→10) at times t3 to t5. The camera control data can be reproduced from the reproduction start position to the reproduction end position along the time axis.

When the time t0 is designated as a first reproduction start position SP1, and the time t2 is designated as a first reproduction end position EP1, the virtual camera is moved in the forward direction 390 along the path 320-2 (10→11→12). When the time t3 is designated as a second reproduction start position SP2, and the time t5 is designated as a second reproduction end position EP2, the virtual camera is moved in the reverse direction 392 along the path 320-2 (12→11→10).

The reproduction start position may be set to the first reproduction start position SP1 or the second reproduction start position SP2 based on an operation input. For example, the reproduction start position may be set to the second reproduction start position SP2 when an acceleration operation input has been performed, and may be set to the first reproduction start position SP2 when a deceleration operation input has been performed. In this case, the virtual camera moves backward relative to the moving object when an acceleration operation input has been performed (392), and moves forward relative to the moving object when a deceleration operation input has been performed (390).

Figure 19A:
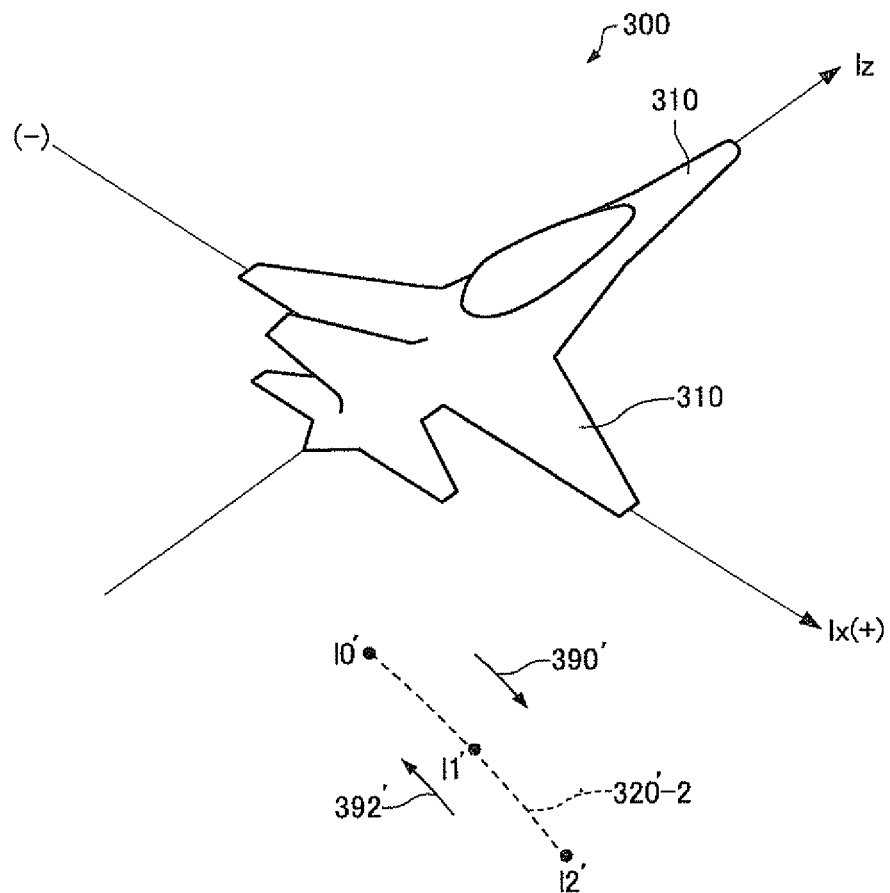
FIGS. 19A and 19B are diagrams illustrating another example in which an operation input is reflected in a first camera control process.
Figure 19B:
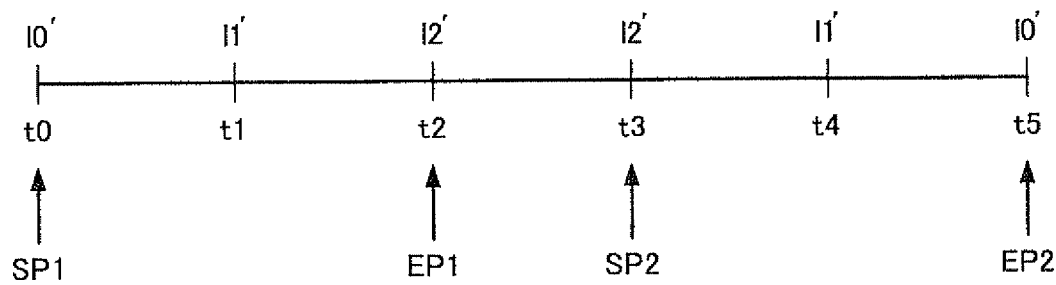

FIGS. 19A and 19B are diagrams illustrating another example in which an operation input is reflected in the first camera control process. Reference numeral 320-2' in FIG. 19A indicates the moving route of the moving object 310 in the local coordinate system 300 defined by the camera control data used for the first camera control process.

FIG. 19B is a diagram illustrating the relationship between the time axis of the camera control data and the position data in the same manner as FIG. 18B.

The reproduction start position may be set based on the input moving direction. For example, the reproduction start position may be set to the second reproduction start position SP2 when a rightward direction (positive X-axis direction) operation input has been performed, and may be set to the first reproduction start position SP2 when a leftward direction (negative X-axis direction) operation input has been performed. In this case, the virtual camera moves leftward relative to the moving object when a rightward direction operation input has been performed (392'), and moves rightward relative to the moving object when a leftward direction operation input has been performed (390').

A lively camera effect in which camera work changes depending on operation input can be implemented by reflecting an operation input in the reproduction start position, as described with reference to FIGS. 18A and 18B or FIGS. 19A and 19B.

Figure 21:
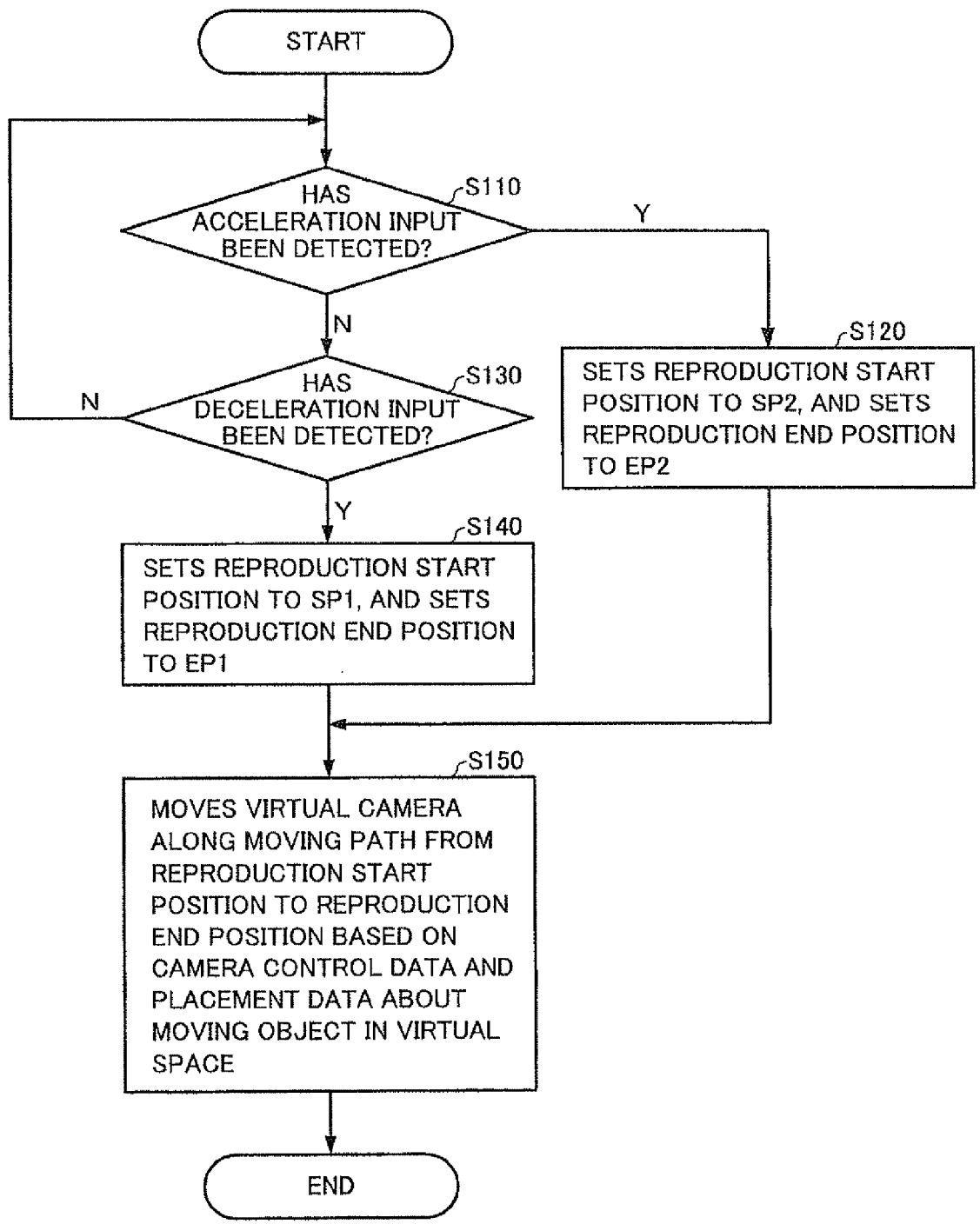
FIG. 21 is a flowchart illustrating the flow of a camera control process according to a second embodiment.

FIG. 21 is a flowchart illustrating the flow of the camera control process (proximate battle camera control process) according to the second embodiment.

When an acceleration input has been detected (step S110), the reproduction start position is set to the second reproduction start position SP2, and the reproduction end position is set to the second reproduction end position EP2 (step S120). When a deceleration input has been detected (step S130), the reproduction start position is set to the first reproduction start position SP1, and the reproduction end position is set to the first reproduction end position EP1 (step S140).

The virtual camera is moved along the moving route from the reproduction start position to the reproduction end position based on the camera control data and the placement data about the moving object in the virtual three-dimensional space (step S150).

The invention is not limited to the above embodiments. Various modifications and variations may be made. For example, any term cited with a different term having a broader meaning or the same meaning at least once in the specification and the drawings may be replaced by the different term in any place in the specification and the drawings.

The second embodiment has been described above taking the position of the camera control data as an example. Note that the invention is not limited thereto. The above control process may be similarly performed using the rotation or the angle of view.

When controlling the virtual camera is controlled by reproducing the camera control data, the camera effect may be changed depending on the reproduction time.

Sound (BGM or effect sound) may be changed based on the movement of the virtual camera. For example, the volume of the bullet discharge sound may be increased as the virtual camera approaches the machine gun (item).

A different effect may be displayed when the enemy aircraft has been destroyed in a state in which the virtual camera is positioned near the machine gun (item). In this case, the player is impressed since the distance between the virtual camera and the enemy is short. For example, a black effect image (e.g., the engine oil discharged from the enemy aircraft) may be disposed within the angle of view of the camera.

The invention may be applied to various game systems such as an arcade game system, a consumer game system, a portable game system, and a system board that generates a game image.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable information storage medium that stores a program that generates an image of a virtual three-dimensional space viewed from a virtual camera, a moving object being disposed in the virtual three-dimensional space, the program causing a computer to function as:

a moving object control section that controls movement of the moving object in the virtual three-dimensional space based on an operation input;

a virtual camera control section that controls a setting of the virtual camera; and an image generation section that generates an image of the virtual three-dimensional space viewed from the virtual camera, wherein the virtual camera control section includes a first camera control section that performs a first camera control process based on camera control data that defines a moving route of the virtual camera in a local coordinate system of the moving object as a change in a relative position of the virtual camera with respect to the moving object, and a position of the moving object in the virtual three-dimensional space in a world coordinate system, the local coordinate system is: (i) a relative coordinate system in which a representative point of the moving object is the origin, and (ii) different from the world coordinate system, the camera control data includes data that defines the moving route that connects a first reference position in the local coordinate system with a target position that is different from the position of the moving object, the target position being set for an item attached to the moving object in the local coordinate system, the virtual camera control section (i) moves the virtual camera to the target position along the moving route in the local coordinate system, when a given operation input has been performed on the item attached to the moving object, and (ii) disposes the virtual camera in the virtual three-dimensional space by changing the position of the virtual camera in the local coordinate system obtained by the moving route to a first setting value in the world coordinate system, the first setting value corresponds to a position of view data at the first reference position, and the first setting value is calculated by summing up position coordinates of the moving object in the world coordinate system and position coordinates of the virtual camera in the local coordinate system of the moving object.

2. The information storage medium as defined in claim 1, wherein the first camera control section starts the first camera control process based on a start timing of the operation input on the item, and finishes the first camera control process based on an end timing of the operation input on the item.

3. The information storage medium as defined in claim 1, wherein, when the operation input on the item has ended, the first camera control section returns a state of the virtual camera to a state indicated by the camera control data when the operation input on the item has started from a state indicated by the camera control data when the operation input on the item has ended.

4. The information storage medium as defined in claim 1, wherein the camera control data includes data corresponding to a plurality of the moving routes different from each other for the item.

5. The information storage medium as defined in claim 1, wherein the first camera control section sets a given point on the moving route as at least one of a reproduction start position and a reproduction end position, and moves the virtual camera along a moving section specified by at least one of the reproduction start position and the reproduction end position.

6. The information storage medium as defined in claim 1, wherein the first camera control section sets a moving direction along the moving route to a forward direction or a reverse direction, and moves the virtual camera along the moving route in the set moving direction.

7. The information storage medium as defined in claim 1, wherein the first camera control section resets a start position that is a given point on the moving route based on at least one of a distance and a positional relationship between the moving object and another moving object, an operation input, and a given parameter, and moves the virtual camera along the moving route.

8. The information storage medium as defined in claim 1, wherein the first camera control section calculates a relative position of the item as an operation target with respect to the moving object in real time based on an operation input, and performs selection of the camera control data or change of a reproduction end position of the moving route based on the calculated relative position.

9. The information storage medium as defined in claim 1, wherein the virtual camera control section further includes a second camera control section that performs a second camera control process on the virtual camera before the first camera control process starts and continues the second camera control process after the first camera control process has started; and the virtual camera control section blends the first setting value obtained by the first camera control process and a second setting value obtained by the second camera control process after the first camera control process has started, and disposes the virtual camera in the virtual three-dimensional space based on a setting value obtained by blending the first setting value and the second setting value.

10. The information storage medium as defined in claim 1, wherein the virtual camera control section performs a transition process that moves the virtual camera from a position of the virtual camera in the local coordinate system of the moving object before the first camera control process starts, to a given reference position in the local coordinate system of the moving object specified by the camera control data.

11. The information storage medium as defined in claim 1, wherein, when the operation input has been performed on a plurality of the items attached to the moving object, the first camera control section selects one item among the items, and performs the first camera control process based on the camera control data corresponding to the selected item.

12. The information storage medium as defined in claim 1, wherein the moving route is set so that the moving route does not intersect the moving object in a state in which the moving object is disposed at the origin of the local coordinate system based on the shape of the model of the moving object.

13. The information storage medium as defined in claim 1, wherein the target position is different from the representative point of the moving object.

14. The information storage medium as defined in claim 1, wherein the target position is not the origin of the local coordinate system.

15. The information storage medium as defined in claim 1, wherein the calculation of the relative position of the virtual camera in the world coordinate system is based on a sum of: (a) the position of the moving object in the world coordinate system, and (b) relative position coordinates of the virtual camera in the local coordinate system.

16. The information storage medium as defined in claim 1, wherein the moving route is set based on a shape of the moving object.

17. The information storage medium as defined in claim 4, wherein the first camera control section selects the camera control data corresponding to one of the plurality of moving routes based on a position or a direction of the moving object or a predetermined game parameter, and performs the first camera control process using the selected camera control data.

18. The information storage medium as defined in claim 9, wherein the virtual camera control section blends the first setting value and the second setting value while changing a blending ratio with passage of time.

19. The information storage medium as defined in claim 18, wherein the second camera control section performs the second camera control process based on camera control data that defines the moving route of the virtual camera as a change in at least one of a relative position and a relative direction of the virtual camera with respect to the moving object, and at least one of a position and a direction of the moving object in the virtual three-dimensional space.

20. An image generation system that generates an image of a virtual three-dimensional space viewed from a virtual camera, a moving object being disposed in the virtual three-dimensional space, the image generation system comprising:
a moving object control section that controls movement of the moving object in the virtual three-dimensional space based on an operation input;
a virtual camera control section that controls a setting of the virtual camera; and
an image generation section that generates an image of the virtual three-dimensional space viewed from the virtual camera, wherein
the virtual camera control section includes a first camera control section that performs a first camera control process based on camera control data that defines a moving route of the virtual camera in a local coordinate system of the moving object as a change in a relative position of the virtual camera with respect to the moving object, and a position of the moving object in the virtual three-dimensional space in a world coordinate system,
the local coordinate system is: (i) a relative coordinate system in which a representative point of the moving object is the origin, and (ii) different from the world coordinate system,
the camera control data includes data that defines the moving route that connects a first reference position in the local coordinate system with a target position that is different from the position of the moving object,
the target position is set for an item attached to the moving object in the local coordinate system,
the virtual camera control section (i) moves the virtual camera to the target position along the moving route in the local coordinate system, when a given operation input has been performed on the item attached to the moving object, and (ii) disposes the virtual camera in the virtual three-dimensional space by changing the position of the virtual camera in the local coordinate system obtained by the moving route to a first setting value in the world coordinate system,
the first setting value corresponds to a position of view data at the first reference position, and
the first setting value is calculated by summing up position coordinates of the moving object in the world coordinate system and position coordinates of the virtual camera in the local coordinate system of the moving object.

21. An image generation method that generates an image of a virtual three-dimensional space viewed from a virtual camera using a computer, a moving object being disposed in the virtual three-dimensional space, the image generation method comprising:
a moving object control step that controls movement of the moving object in the virtual three-dimensional space based on an operation input;
a virtual camera control step that controls a setting of the virtual camera; and
an image generation step that generates an image of the virtual three-dimensional space viewed from the virtual camera, wherein
the virtual camera control step includes performing a first camera control process based on camera control data that defines a moving route of the virtual camera in a local coordinate system of the moving object as a change in a relative position of the virtual camera with respect to the moving object, and a position of the moving object in the virtual three-dimensional space in a world coordinate system,
the local coordinate system is: (i) a relative coordinate system in which a representative point of the moving object is the origin, and (ii) different from the world coordinate system,
the camera control data includes data that defines the moving route that connects a first reference position in the local coordinate system with a target position that is different from the position of the moving object,
the target position is set for an item attached to the moving object in the local coordinate system,
the virtual camera control step includes: (i) moving the virtual camera to the target position along the moving route in the local coordinate system, when a given operation input has been performed on the item attached to the moving object, and (ii) disposing the virtual camera in the virtual three-dimensional space by changing the position of the virtual camera in the local coordinate system obtained by the moving route to a first setting value in the world coordinate system,
the first setting value corresponds to a position of view data at the first reference position, and
the first setting value is calculated by summing up position coordinates of the moving object in the world coordinate system and position coordinates of the virtual camera in the local coordinate system of the moving object.

22. A non-transitory computer-readable information storage medium that stores a program that generates an image of a virtual three-dimensional space viewed from a virtual camera, a moving object being disposed in the virtual three-dimensional space, the program causing a computer to function as:
a moving object control section that controls movement of the moving object in the virtual three-dimensional space based on an operation input;
a virtual camera control section that controls a setting of the virtual camera; and
an image generation section that generates an image of the virtual three-dimensional space viewed from the virtual camera, wherein
the virtual camera control section includes a first camera control section that performs a first camera control process based on camera control data that defines a moving route of the virtual camera in a local coordinate system of the moving object as a change in a relative position of the virtual camera with respect to the moving object, and a position of the moving object in the virtual three-dimensional space in a world coordinate system, the local coordinate system is: (i) a relative coordinate system in which a representative point of the moving object is the origin, and (ii) different from the world coordinate system,
the camera control data includes data that defines a plurality of moving routes that are different from each other for an item attached to the moving object and each connect a given reference position in the local coordinate system with a target position set for the item attached to the moving object in the local coordinate system,
the virtual camera control section (i) moves the virtual camera to the target position along the moving route in the local coordinate system, when a given operation input has been performed on the item attached to the moving object, and (ii) disposes the virtual camera in the virtual three-dimensional space by changing the position of the virtual camera in the local coordinate system obtained by the moving routes to a first setting value in the world coordinate system, and the first setting value corresponds to a position of view data at the first reference position, the first setting value being calculated by summing up position coordinates of the moving object in the world coordinate system and position coordinates of the virtual camera in the local coordinate system of the moving object.

23. A non-transitory computer-readable information storage medium that stores a program that generates an image of a virtual three-dimensional space viewed from a virtual camera, a moving object being disposed in the virtual three-dimensional space, the program causing a computer to function as:

a moving object control section that controls movement of the moving object in the virtual three-dimensional space based on an operation input;

a virtual camera control section that controls a setting of the virtual camera; and an image generation section that generates an image of the virtual three-dimensional space viewed from the virtual camera, wherein the virtual camera control section includes a first camera control section that performs a first camera control process based on camera control data that defines a moving route of the virtual camera in a local coordinate system of the moving object as a change in a relative position of the virtual camera with respect to the moving object, and a position of the moving object in the virtual three-dimensional space in a world coordinate system, the local coordinate system is: (i) a relative coordinate system in which a representative point of the moving object is the origin, and (ii) different from the world coordinate system, the camera control data includes data that defines a plurality of the moving routes that connects a given reference position in the local coordinate system with a target position set for a plurality of the items attached to the moving object in the local coordinate system, the virtual camera control section (i) moves the virtual camera to the target position along the moving route in the local coordinate system, when a given operation input has been performed on the item attached to the moving object, and (ii) disposes the virtual camera in the virtual three-dimensional space by changing the position of the virtual camera in the local coordinate system obtained by the moving routes to a first setting value in the world coordinate system, the first setting value corresponds to a position of view data at the first reference position, and the first setting value is calculated by summing up position coordinates of the moving object in the world coordinate system and position coordinates of the virtual camera in the local coordinate system of the moving object.

24. A non-transitory computer-readable information storage medium that stores a program that generates an image of a virtual three-dimensional space viewed from a virtual camera, a moving object being disposed in the virtual three-dimensional space, the program causing a computer to function as:

a moving object control section that controls movement of the moving object in the virtual three-dimensional space based on an operation input;

a virtual camera control section that controls a setting of the virtual camera; and an image generation section that generates an image of the virtual three-dimensional space viewed from the virtual camera, wherein the virtual camera control section includes a first camera control section that performs a first camera control process based on camera control data that defines a moving route of the virtual camera in a local coordinate system of the moving object as a change in a relative position of the virtual camera with respect to the moving object, and a position of the moving object in the virtual three-dimensional space in a world coordinate system, the local coordinate system is: (i) a relative coordinate system in which a representative point of the moving object is the origin, and (ii) different from the world coordinate system, the virtual camera control section includes a second camera control section that performs a second camera control process on the virtual camera before the first camera control process starts and continues the second camera control process after the first camera control process has started, the camera control data includes data that defines the moving route that connects a first reference position in the local coordinate system with a target position that is different from the position of the moving object, the target position is set for an item attached to the moving object in the local coordinate system, the virtual camera control section (i) moves the virtual camera to the target position along the moving route in the local coordinate system, when a given operation input has been performed on the item attached to the moving object, and (ii) disposes the virtual camera in the virtual three-dimensional space by changing the position of the virtual camera in the local coordinate system obtained by the moving route to a first setting value in the world coordinate system, the first setting value corresponds to a position of view data at the first reference position, and the first setting value is calculated by summing up position coordinates of the moving object in the world coordinate system and position coordinates of the virtual camera in the local coordinate system of the moving object.

* * * * *